(12) United States Patent
Ros

(10) Patent No.: US 11,787,147 B2
(45) Date of Patent: Oct. 17, 2023

(54) THERMAL INSULATING ELEMENT

(71) Applicant: REP IP AG, Zug (CH)

(72) Inventor: Nico Ros, Riehen (CH)

(73) Assignee: REP IP AG, Zug (CH)

(*) Notice: Subject to any disclaimer, the term of this patent is extended or adjusted under 35 U.S.C. 154(b) by 676 days.

(21) Appl. No.: 16/646,620

(22) PCT Filed: Sep. 12, 2018

(86) PCT No.: PCT/IB2018/056953
§ 371 (c)(1),
(2) Date: Mar. 12, 2020

(87) PCT Pub. No.: WO2019/053601
PCT Pub. Date: Mar. 21, 2019

(65) Prior Publication Data
US 2020/0247083 A1 Aug. 6, 2020

(30) Foreign Application Priority Data

Sep. 12, 2017 (AT) .................................. A 361/2017

(51) Int. Cl.
| | |
|---|---|
| *B32B 3/12* | (2006.01) |
| *B29C 51/08* | (2006.01) |
| *B29C 51/26* | (2006.01) |
| *B32B 27/08* | (2006.01) |
| *E04B 1/80* | (2006.01) |
| *E04B 2/36* | (2006.01) |

(Continued)

(52) U.S. Cl.
CPC .............. *B32B 3/12* (2013.01); *B29C 51/082* (2013.01); *B29C 51/267* (2013.01); *B32B 27/08* (2013.01);

(Continued)

(58) Field of Classification Search
CPC ........................................................ B32B 3/12
See application file for complete search history.

(56) References Cited

U.S. PATENT DOCUMENTS

| 2,856,323 A | 10/1958 | Gordon |
| 5,270,092 A | 12/1993 | Griffith et al. |

(Continued)

FOREIGN PATENT DOCUMENTS

| CH | 70315 | 4/1915 |
| DE | 4114506 A1 | 11/1992 |

(Continued)

OTHER PUBLICATIONS

Clipart ETC, "Drawing Maltese Cross Using T-square, Spacers, and Triangles", 2010, p. 1; Accessed at https://web.archive.org/web/20101209192107/https://etc.usf.edu/clipart/76100/76179/76179_maltese-crss.htm.*

(Continued)

*Primary Examiner* — Mark Ruthkosky
*Assistant Examiner* — Julia L Rummel
(74) *Attorney, Agent, or Firm* — Pillsbury Winthrop Shaw Pittman, LLP

(57) ABSTRACT

An insulating element for thermally insulating spaces, including closed cells, in which a first and a second group of closed cells are formed by first or second recesses in a first or second flat element and the first and the second flat elements form first or second connection regions between recesses adjacent to the edges of the openings, to which respectively a flat covering element closing the openings of a plurality of first recesses is bonded on a front side of the flat element. The second recesses are arranged between the first recesses on a rear side of the first flat element and the first recesses are arranged between the second recesses on a rear side of the second flat element such that the space remaining of the first and second recesses between the first and the second flat elements amounts to less than 50% of the space enclosed by the first and second recesses.

21 Claims, 18 Drawing Sheets

(51) Int. Cl.
*E04B 1/76* (2006.01)
*E04B 1/74* (2006.01)

(52) U.S. Cl.
CPC ............... *E04B 1/76* (2013.01); *E04B 1/806* (2013.01); *E04B 2/36* (2013.01); *B32B 2255/10* (2013.01); *B32B 2255/205* (2013.01); *B32B 2307/304* (2013.01); *B32B 2607/00* (2013.01); *E04B 2001/742* (2013.01); *E04B 2001/7691* (2013.01)

(56) References Cited

U.S. PATENT DOCUMENTS

| | | | |
|---|---|---|---|
| 5,894,045 A * | 4/1999 | Desrondiers | B32B 3/12 |
| | | | 52/793.1 |
| 2014/0117026 A1* | 5/2014 | Ros | B32B 3/02 |
| | | | 220/592.21 |

FOREIGN PATENT DOCUMENTS

| | | |
|---|---|---|
| EP | 0250005 A1 | 12/1987 |
| EP | 2560818 A1 | 2/2013 |
| WO | 2007/010868 A1 | 1/2007 |
| WO | 2011/032299 A1 | 3/2011 |
| WO | 2012/142639 A1 | 10/2012 |
| WO | 2013/149182 A1 | 10/2013 |
| WO | 2016/085220 A1 | 6/2016 |

OTHER PUBLICATIONS

International Search Report dated Dec. 7, 2018 issued in corresponding International Patent Application No. PCT/IB2018/056953 with English translation (7 pgs.).

* cited by examiner

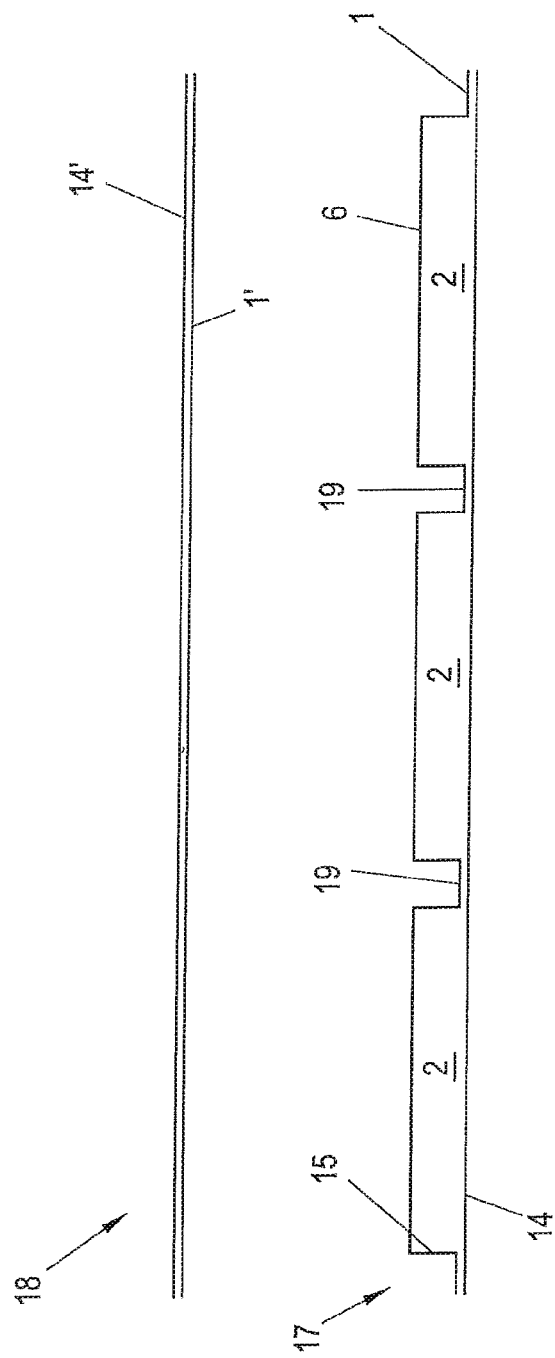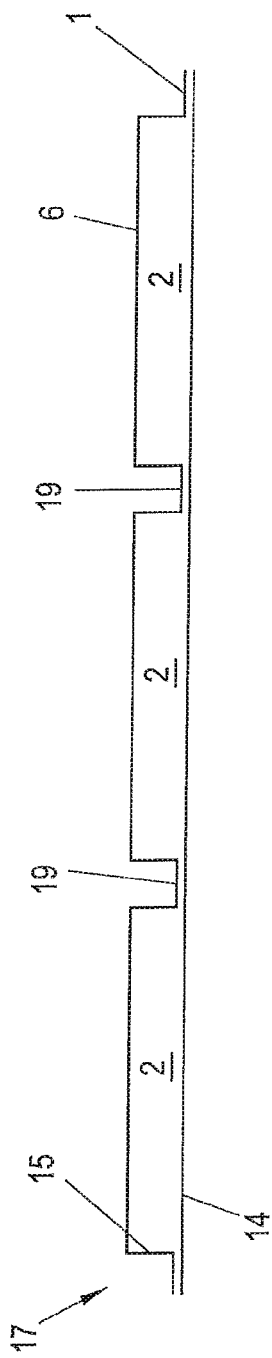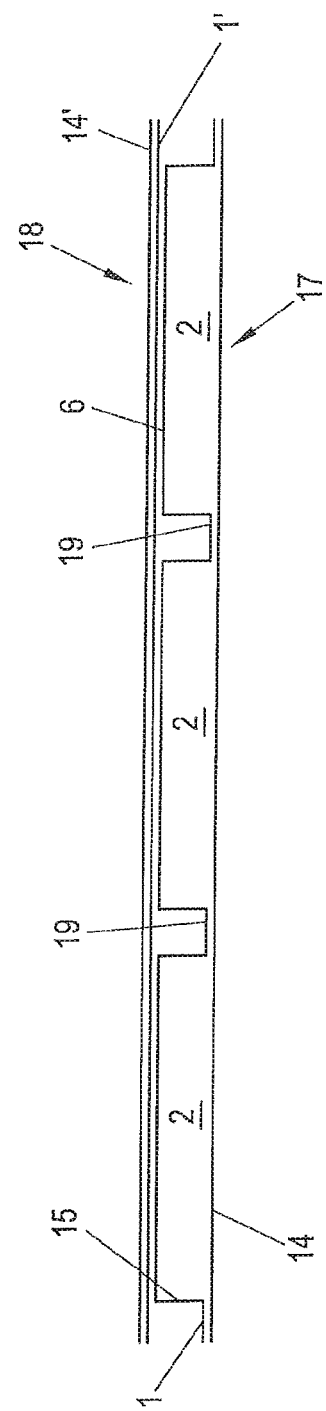

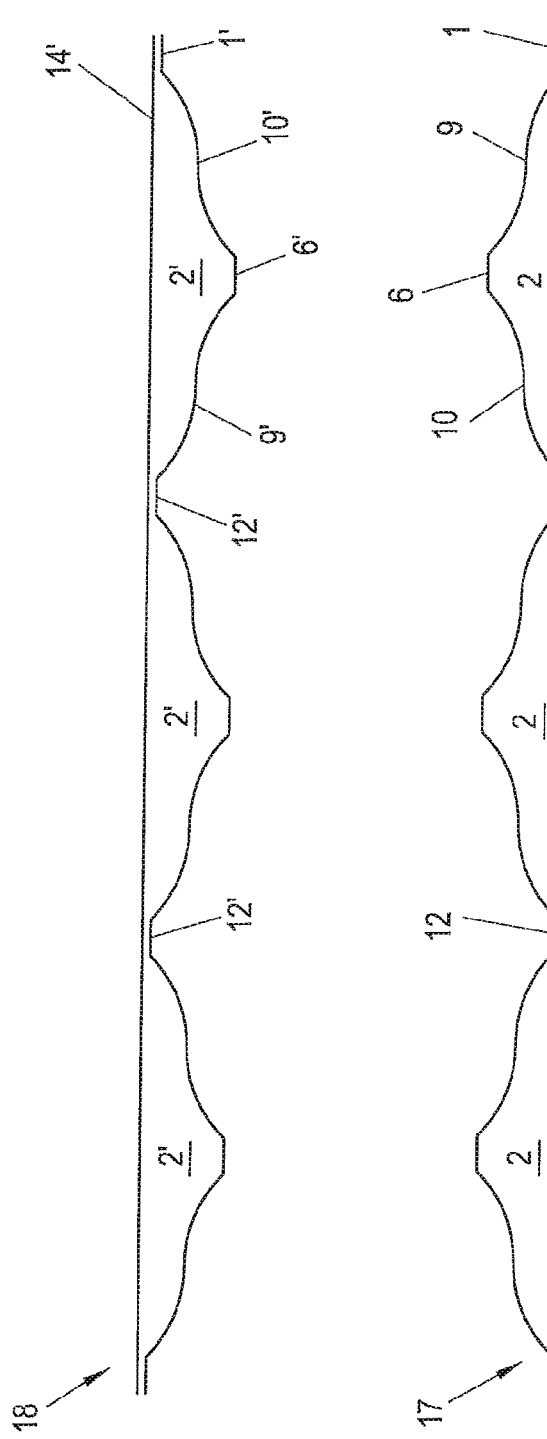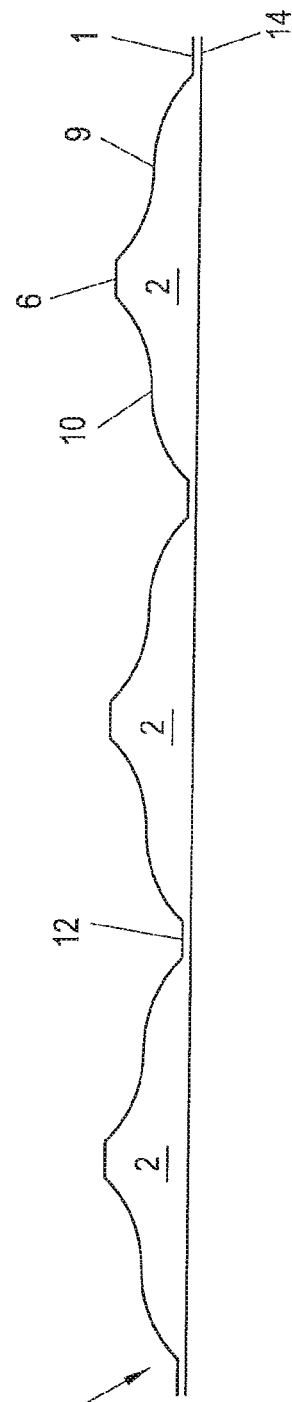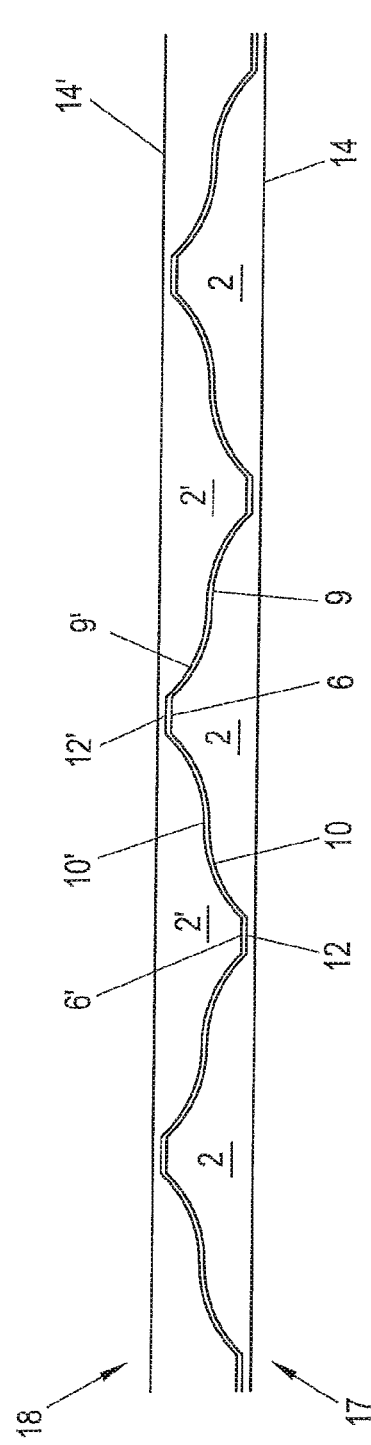

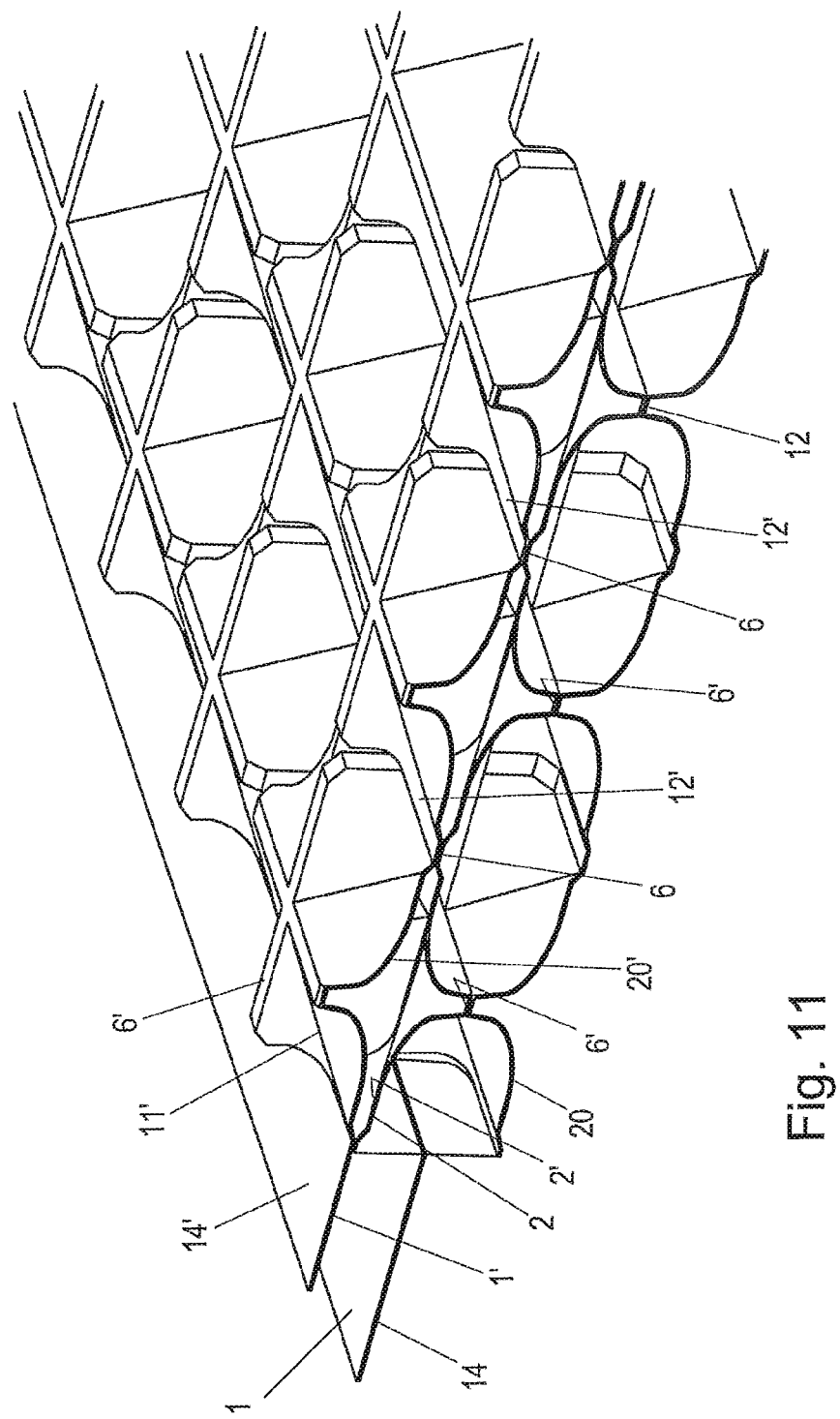

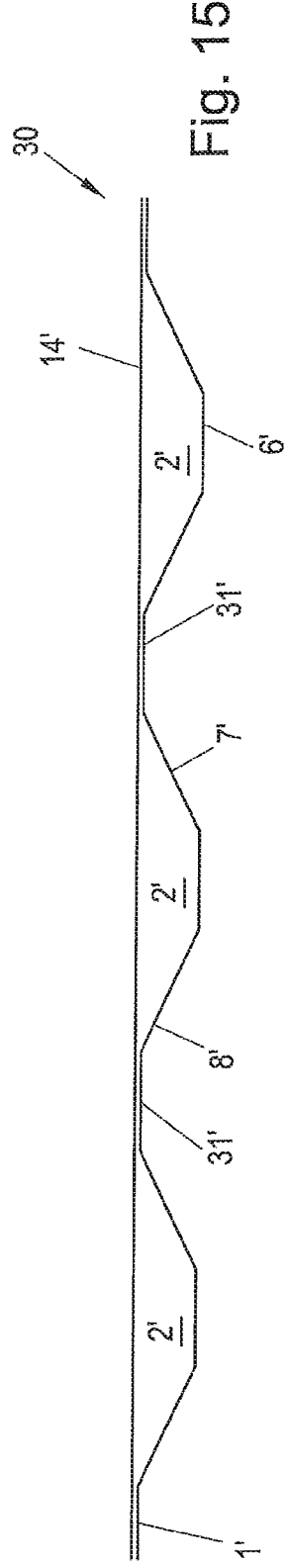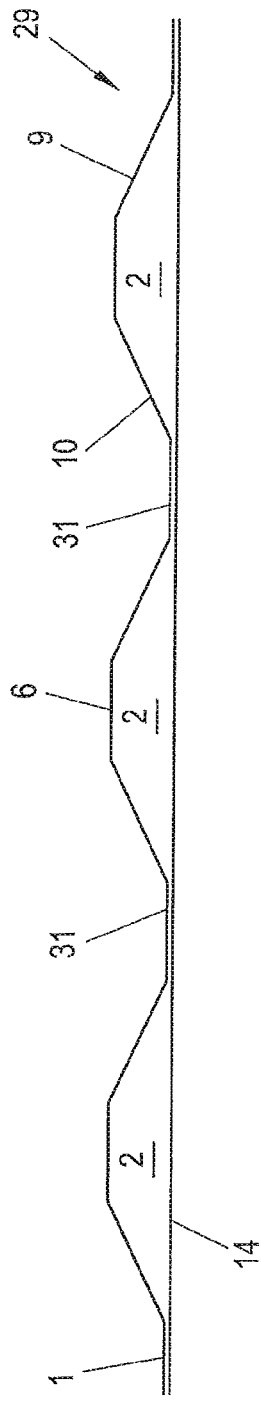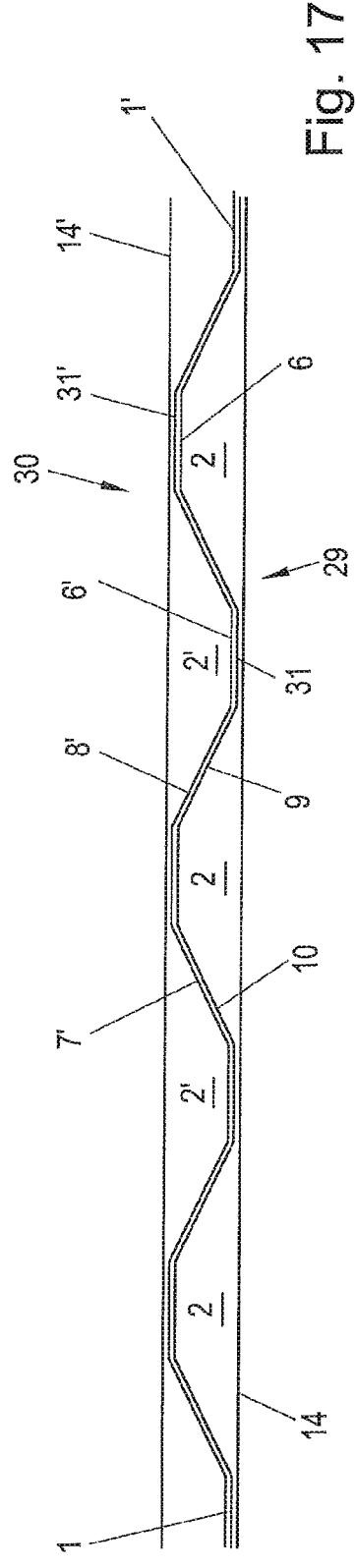

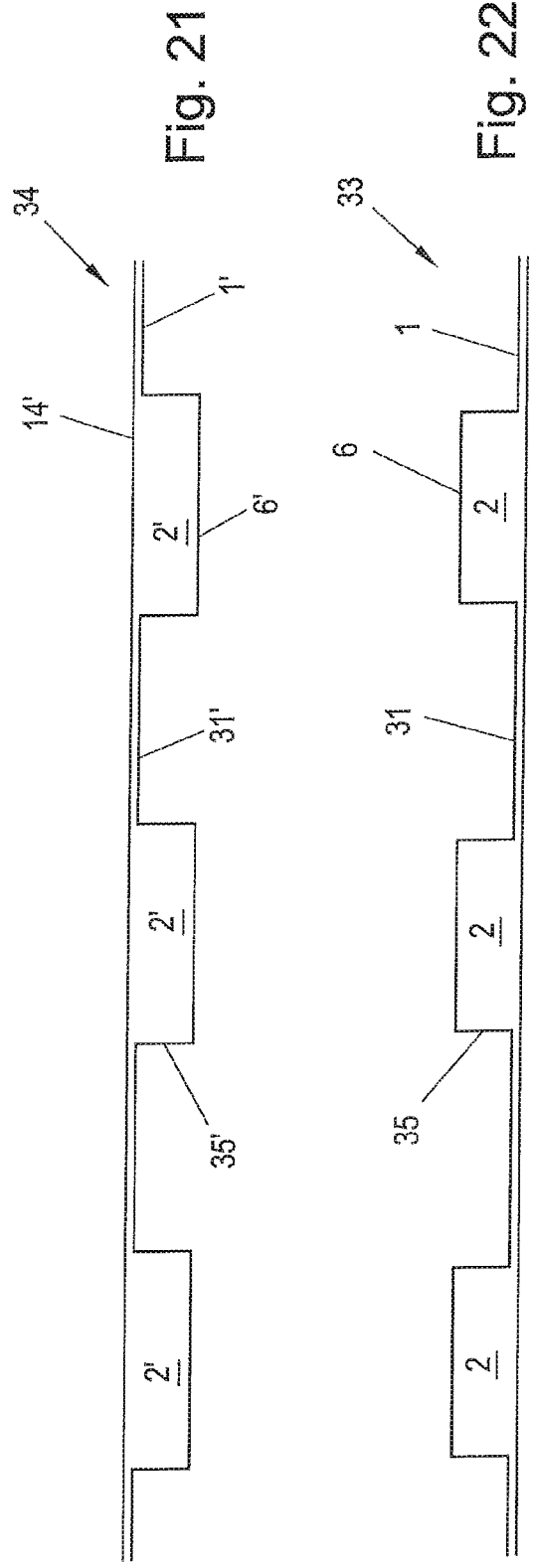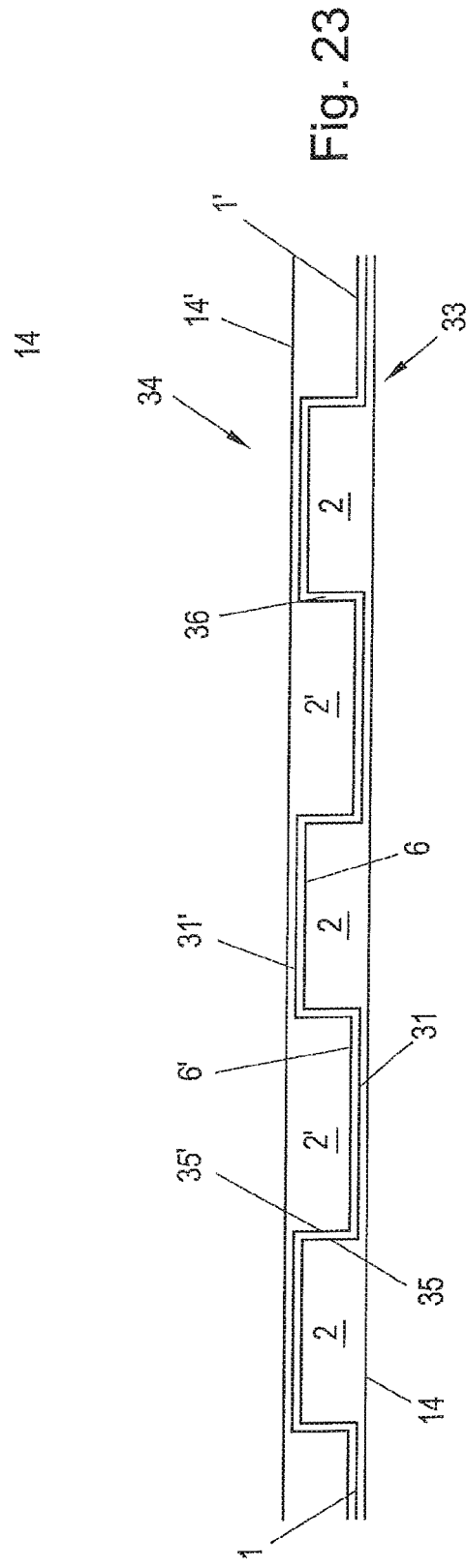

THERMAL INSULATING ELEMENT

CROSS-REFERENCE TO RELATED APPLICATIONS

This application is a national stage entry of PCT/IB2018/056953, filed Sep. 12, 2018, which claims priority to Austrian Application No. A 361/2017, filed Sep. 12, 2017, the entire contents of each of which are herein incorporated by reference in their entireties.

The invention relates to an insulating element for thermally insulating spaces, comprising a plurality of closed cells, wherein a first group of closed cells is formed by first recesses in a first flat element, and the first flat element between the edges of the openings of adjacent recesses forms first connection regions to which a first flat cover element closing the openings of a plurality of first recesses is materially bonded on a front side of the first flat element.

The invention further relates to a method for producing such an insulating element.

In the building industry, efficient and economical insulation measures are sought. It is endeavored to provide a high heat and cold protection by an insulating layer as thin as possible and at costs as low as possible. The purpose of insulation is to minimize the three heat transfer mechanisms, i.e. conduction, convection and radiation. To this end, a core element that conducts heat poorly is used in conventional insulations. In addition, attempts have been made to minimize heat introduction by radiation using suitable coatings for the core material. Foams based on polystyrene or polyurethane are used as core materials having low thermal conductivity coefficients. These insulating materials achieve thermal conductivity coefficients of down to 22 mW/mK and are low-cost as compared to high-performance insulating materials (<20 mW/mK). Insulants of polyurethane are, moreover, easy to handle and simple to use. However, they can neither be produced from recycled materials nor can they be recycled due to the thermosetting plastics used. Unlike other insulations, insulants of foamed polystyrene or polyurethane, moreover, occupy substantially more space, which sometimes constitutes an exclusion criterion.

There are, moreover, various high-performance insulations trying to minimize the thermal conductivity coefficient in order to save space. These comprise, for instance, vacuum panels and aerogels. The advantages of such insulations are their low thermal conductivity coefficients of 5 mW/mK or less. Vacuum panels offer excellent protection from thermal conduction, yet such insulations involve the great disadvantages of high costs and poor workability. Besides, vacuum panels, due to the high-density films on the joints, have several weak points, which deteriorate the overall value of the insulating effect. A further problem is their service life. Moreover, vacuum panels involve the risk of the vacuum of the entire panel being lost by a small cut. The insulating value will thus immediately decline by a multiple. Apart from the drawbacks in processing and the risk of damage, vacuum panels are comparatively expensive.

As compared to vacuum panels, aerogels show considerably better workability. Yet, their insulating value of about 17 mW/mK is substantially poorer than that of vacuum panels. In addition to the poorer insulating value, the main drawback of aerogels is that they have very high production costs.

Panel-shaped insulating elements comprising a plurality of closed cells in the form of a honeycomb structure element have become known from WO 2011/032299 A1 and WO 2012/142639 A1. They offer the advantage of a cost-effective production of the honeycomb structure element from polymer fibers, wherein recesses in the polymer films are obtained by deep-drawing and the recesses can be closed by applying a further polymer film. The cells formed by the closed recesses can be filled with gas having a low thermal conductivity coefficient. Furthermore, heat transfer can be reduced by applying a reflecting metal layer with a low thermal emissivity. Said insulating element offers acceptable insulating properties, yet the degree of utilization in respect to cell gas filling is low because of the design such that only a portion of the volume of the insulating element can be filled with a gas having a low thermal conductivity coefficient. Moreover, a metal coating on both sides is necessary.

The present invention, therefore, aims to improve an insulating element comprising a plurality of closed cells to the effect that the insulating properties can be improved and the production can be simplified and realized in a cost-effective manner, wherein production from recycled materials is to be feasible. Furthermore, preferably all of the three heat transfer mechanisms are to be taken into consideration so as to reduce heat transfer by conduction, convection and radiation.

To solve this object, the invention in an insulating element of the initially defined kind substantially provides that a second group of closed cells is provided, which is formed by second recesses in a second flat element, and the second flat element between the edges of the openings of adjacent recesses forms second connection regions to which a second flat cover element closing the openings of a plurality of second recesses is materially bonded on a front side of the second flat element, wherein the second recesses are provided on a rear side of the first flat element between the first recesses, and the first recesses are provided on a rear side of the second flat element between the second recesses, so that the volume remaining free of first and second recesses between the first and second flat elements is less than 50%, preferably less than 40%, preferably less than 30%, preferably less than 20%, preferably less than 10%, in particular less than 5%, of the volume enclosed by the first and second recesses together.

Thus, at least a first and a second group of cells are provided, which are respectively formed by recesses in a first and a second flat element so as to enable production in a simple and cost-effective manner, based on a flat, in particular planar or plane, element such as a film or foil. Each closed cell is formed by a respective recess closed by the flat cover element. Thus, just a recess in the first and in the second flat element, and an associated flat cover element for closing the recess, are required to produce a closed cell. Since the cells of the first group and the cells of the second group are formed independently of one another, the cells of the first group and the cells of the second group can be produced separately from one another, which, in particular, offers the advantage that possible filling of the cells with a gas can be accomplished in a substantially simpler manner during the separate production.

The assemblage of the element comprising the first group of cells and the second group of cells, due to the design, is effected in a separate step, i.e. after the production of the closed cells, wherein the mutual arrangement of the first and second recesses takes place in such a manner that the flat elements face each other by their rear sides so that the first recesses are disposed between the second recesses and vice versa. The side lying opposite the front side, of the first and second element, respectively, is denoted by rear side. The front side is that side of the flat element, on which the originally open recesses are closed by means of the flat cover element. The rear side is that side of the flat element, on which the recesses protrude from the plane of the flat element.

The shaping of the first and second recesses is configured such that the closed cells of the first group and the closed cells of the second group occupy as large a portion as possible of the volume present between the flat elements, or that as small a portion as possible of this volume remains free. When the first and the second flat elements are disposed in parallel with each other, the volume present between the flat elements will be obtained by multiplying the surface extension of the first and second flat elements (where these surfaces do not exactly cover each other, only the overlapping surface will be used) by the normal distance between the first and second flat elements.

In this respect, it is, in particular, provided that the volume remaining free of first and second recesses, between the first and second flat elements is less than 50%, preferably less than 40%, preferably less than 30%, preferably less than 20%, preferably less than 10%, in particular less than 5%, of the volume enclosed by the first and second recesses together. This has the effect that the portion of the volume that can be filled with a gas having a low thermal conductivity coefficient can be optimized so as to optimize the insulating effect. By contrast, in the configurations with honeycomb-like cells according to WO 2011/032299 A1 and WO 2012/142639 A1, at least ⅓ of the total volume is occupied by cells that are not prefabricated and, therefore, are only difficult to fill with a gas.

The production of the insulating element according to the invention can be accomplished in a particularly cost-effective manner, if, as in correspondence with a preferred configuration, the first and/or the second flat element, and optionally the first and/or the second flat cover element, are formed by a polymer film, preferably of polyethylene, polyethylene terephthalate, polystyrene or PVC, said film preferably having a thickness of 0.01 mm to 1 mm. Suitable polymer films are available at reasonable prices and can also be recovered from recycled materials.

According to a preferred configuration, it is provided that the first and/or the second recesses are obtained from the first flat element and/or the first flat cover element, respectively.

In respect to the configuration of the recesses, it may be provided that the second recesses each comprise a base, an opening and walls connecting the base to the edge of the opening, wherein the second recesses are disposed on a rear side of the first flat element in such a manner that the bases of the second recesses in the first connecting regions contact die same. In the contact region, material bonding can be implemented, e.g. by gluing or welding, in particular ultrasonic welding.

An optimization of the insulating effect will be achieved in that the portion of the first flat element is minimized in the first connecting region that does not border with a closed cell. To this end, it is preferably provided that the sum of the bases of the second recesses corresponds to at least 70%, preferably at least 80%, preferably at least 90%, in particular at least 95%, of the sum of the surface areas of the first connecting regions.

In respect to the first recesses, it preferably provided that they each comprise a base, an opening and walls connecting the base to the edge of the opening, wherein the first recesses are disposed on a rear side of the second flat element in such a manner that the bases of the first recesses in the second connecting regions contact the same. In the contact region, material bonding can be implemented, e.g. by gluing or welding, in particular ultrasonic welding.

The sum of the bases of the first recesses preferably corresponds to at least 70%, preferably at least 80%, preferably at least 90%, in particular at least 95%, of the sum of the surface areas of the second connecting regions.

According to a preferred configuration, by first connecting regions the total surface area free of first recesses, of the first flat element is to be understood, and by second connecting regions the total surface area free of second recesses, of the second flat element is to be understood.

In order to minimize the portion free of closed cells of the volume, it is preferably provided that the walls of the first recesses and the walls of the second recesses are arranged in parallel or lie in planar abutment with each other.

The insulating element according to the invention is preferably designed as a self-supporting, rigid panel, which can, for instance, be used for construction purposes for bounding spaces.

A parallelepipedic shape of the insulating element will preferably be achieved in that the first and second flat cover elements extend in parallel with each other and, in particular, are planarly designed. In this case, the bases of the first and/or second recesses preferably extend in parallel with the plane of the associated flat element.

A particularly advantageous arrangement of the recesses will result, if the first and/or second recesses are arranged in a raster comprising a plurality of rows and columns of recesses, the rows and columns extending transversely to one another, in particular at an angle of 90°. A space-saving arrangement will preferably result, if the openings of the first and/or second recesses are designed to be rectangular, in particular square.

In the case of the mentioned arrangement of the recesses in a raster, strip-shaped connecting regions, in particular a grid of strip-shaped connecting regions extending transversely, in particular at an angle of 90°, relative to one another will advantageously result between the recesses.

Following the grid-shaped geometry of the connecting regions, an optimized design of the recesses provides that the bases of the first and/or second recesses are cross-shaped and the first recesses are arranged such that the cross-shaped base, by its point of intersection, rests on the point of intersection of two strip-shaped connecting regions.

This enables a configuration in which the first and the second recesses have the same three-dimensional shape, thus especially simplifying their production.

An advantageous configuration in this respect provides that the rear side of a plurality of first recesses represents a negative form for at least a second recess. The second recesses consequently fit exactly between the first recesses, with a very small portion of the total volume free of closed cells thus remaining at best.

In an advantageous manner, in particular with a view to maximizing the path that has to be travelled by the introduced thermal energy through thermal conduction, the walls of the first and/or second recesses each obliquely extend to the nearest edge, starting from the cross-shaped base.

As already pointed out above, thermal conduction can also be minimized in that the cells are filled with a gas, preferably a gas having a thermal conductivity coefficient of <0.026 W/mK, preferably <0.17 W/mK, preferably <0.009 W/mK, preferably <0.0055 W/mK, such as $CO_2$, nitrogen or a noble gas, in particular argon, xenon, krypton or mixtures thereof.

If, as in correspondence with a preferred further development of the invention, the gas in the cell(s) is under subatmospheric pressure, in particular under a pressure of 100-700 mbar, the costs of the noble gas filling can be reduced to a fraction by lowering the gas pressure so as to render an insulating material with a noble gas filling affordable in the construction industry or for other purposes. In a pressure range in which any vacuum insulation loses its efficiency, the efficiency of the noble gas insulation at negative pressure, however, will be retained so as to ensure a substantially longer service life despite inflowing air.

In this respect, it is preferably provided that the cells are substantially designed to be gas-tight.

The thermal insulation can preferably also be improved in that the cells are filled with latent heat storages. A latent heat storage is a device that is capable of storing thermal energy latently, at a low loss, with many repetition cycles, and over extended periods of time. To this end, phase change materials (PCMs) are used, whose latent melting heat, solution heat or absorption heat is substantially higher than the heat that they are able to store owing to their normal specific thermal capacity (without the phase change effect). Latent heat storages function by utilizing the enthalpy reversible thermodynamic condition changes of a storage medium, e.g. the phase transition solid-liquid. The utilization of the phase transition from solid to liquid is the principle used most in this context.

In order to minimize the heat transfer by thermal radiation, it is preferably provided that the first and/or the second flat element, and optionally the first and/or the second flat cover element, on at least one side comprises a coating, preferably a metallic and, in particular, gas-tight coating, preferably a coating with an emissivity of <0.5, preferably <0.2, particularly preferably <0.04, such as a coating of aluminum.

In this connection, it will do if the coating is applied on the inner sides of the cells.

According to a preferred configuration, the coating has a layer thickness of <80 nm, preferably <50 nm. Due to the small layer thickness, it is possible to combine the advantage of low thermal conductivity, e.g. of polymers of the flat element, with gas-tight metal layers in the nanometer range such that the insulating material will reflect heat rays to a considerable extent and, at the same time, is preferably gas-tightly closed, yet the nature of the metal layer is such that its thermal conduction is reduced to a minimum. Metallic coatings in insulating elements are problematic because of their high thermal conductivities, thus involving the risk of at least partially nullifying the advantages of the low thermal conductivity of the carrier element by the high conductivity of the metallic coating. In the context of the present invention, it has become possible to considerably reduce the emissivity of the heat radiation (from preferably <0.1), optimize the gas tightness, and at the same time minimize the thermal conduction through the metallic coating on account of the extremely small layer thickness of <80 nm, in particular <50 nm. Furthermore, the morphology, in particular in the transition zone between the polymer substrate and the metal coating, renders the heat transfer between the metal coating and the carrier element difficult.

A preferred further development provides that the coating is comprised of silver. Although silver has an extremely high thermal conductivity (429 $Wm^{-1}K^{-1}$) so that as small a layer thickness as possible of preferably below 50 nm is of particular importance, it is characterized by a high oxidation resistance, a high gas tightness and antibacterial properties.

It is particularly preferred if the coating applied by sputter deposition. A high sputter yield is in fact observed especially with silver. Sputtering in the context of the invention is of particular advantage, since a high layer quality is already enabled with very thin layers and the formation of a boundary layer on polymers is possible. Sputtering (cathode spraying) is a physical process by which atoms are dissolved out of a solid body (target) by bombardment with energy-rich ions (primarily noble gas ions), thus passing into the gas phase. During the sputter deposition, a substrate is approached to the target such that the expelled atoms will condense and be able to form a layer thereon. Sputter deposition is thus a high-vacuum-based coating technique belonging to the group of PVD processes, which is known to the skilled artisan and need not be explained in more detail here.

The first and the second flat cover elements, which are preferably each formed by a polymer film, can be designed to be planar and unstructured as already mentioned above, or may even comprise a structure. The first and/or the second flat cover element may, in particular, comprise recesses which, together with the recesses of the flat element to which the flat cover element is connected, define closed cells. A preferred configuration in this respect provides that the first and/or the second flat cover element comprises a plurality of third and fourth recesses, respectively, which are designed to be mirror-inverted relative to the first and second recesses, respectively, wherein the first and/or second flat cover element between the edges of the openings of adjacent third and/or fourth recesses forms third and/or fourth connecting regions, the first and third, and the second and fourth, connecting regions being materially bonded to each other.

The structure according to the invention of the first flat element and the second flat element with their associated flat cover elements forms a layer of the insulating element. The insulating element may be comprised of this one layer as a single layer, or the insulating element may be assembled of two or more of such superimposed layers, thus enabling the realization of different thicknesses in a simple manner.

The insulating element according to the invention is advantageously designed as a panel, wherein several panels can be assembled to form an insulating container if, as in correspondence with a preferred further development, the insulating elements are self-supporting. The panels may, however, also be used as inner linings or outer linings of existing containers. The panels preferably comprise connecting elements on their edges so as to enable the interconnection of adjacent panels in a simple manner. These may, for instance, include positive-locking connecting elements such as profiles for producing a tongue-and-groove connection.

Basically, the insulating elements according to the invention are suitable both for insulating a cold internal atmosphere from a warmer environment and for insulating a warm internal atmosphere from a cold environment.

The invention further relates to an advantageous method for producing an insulating element, in which a flat element is heated, deep-drawn for forming recesses, and the recesses are closed by a flat cover element for forming closed cells, wherein the flat element is guided over a first roller, which comprises negative forms of the recesses, for deep-drawing the recesses, and the flat cover element is guided over a second roller whose axis extends in parallel with the axis of rotation of the first roller such that the deep-drawn flat element and the flat cover element are pressed at each other in the gap between the first and second rollers and materially connected to each other. Two elements obtained in such a manner are fit into each other to obtain the insulating element according to the invention.

A preferred process control provides that material bonding of the deep-drawn flat element to the flat cover element is effected by gluing or welding, in particular ultrasonic welding.

A further preferred process control provides that a gas is supplied to the gap between the first and second rollers, which gas is conducted into the recesses prior to closing the recesses.

A preferred process control provides that the flat cover element is heated and, for forming recesses, is guided over the second roller, which comprises negative forms of the recesses.

A further preferred process control provides that the flat element and/or the flat cover element comprises a coating, and the flat element and the flat cover element are respectively supplied to the first and second rollers in such a manner that the coating is disposed on the side facing the other element.

In the following, the invention will be explained more detail by way of exemplary embodiments schematically illustrated in the drawing. Therein, FIG. 1 illustrates a first flat element with recesses from the rear side;

FIG. 5 depicts a section through element 18 along line V-V of FIG. 2;

FIG. 6 depicts a section through element 17 along line VI-VI of FIG. 1;

Figure 1:
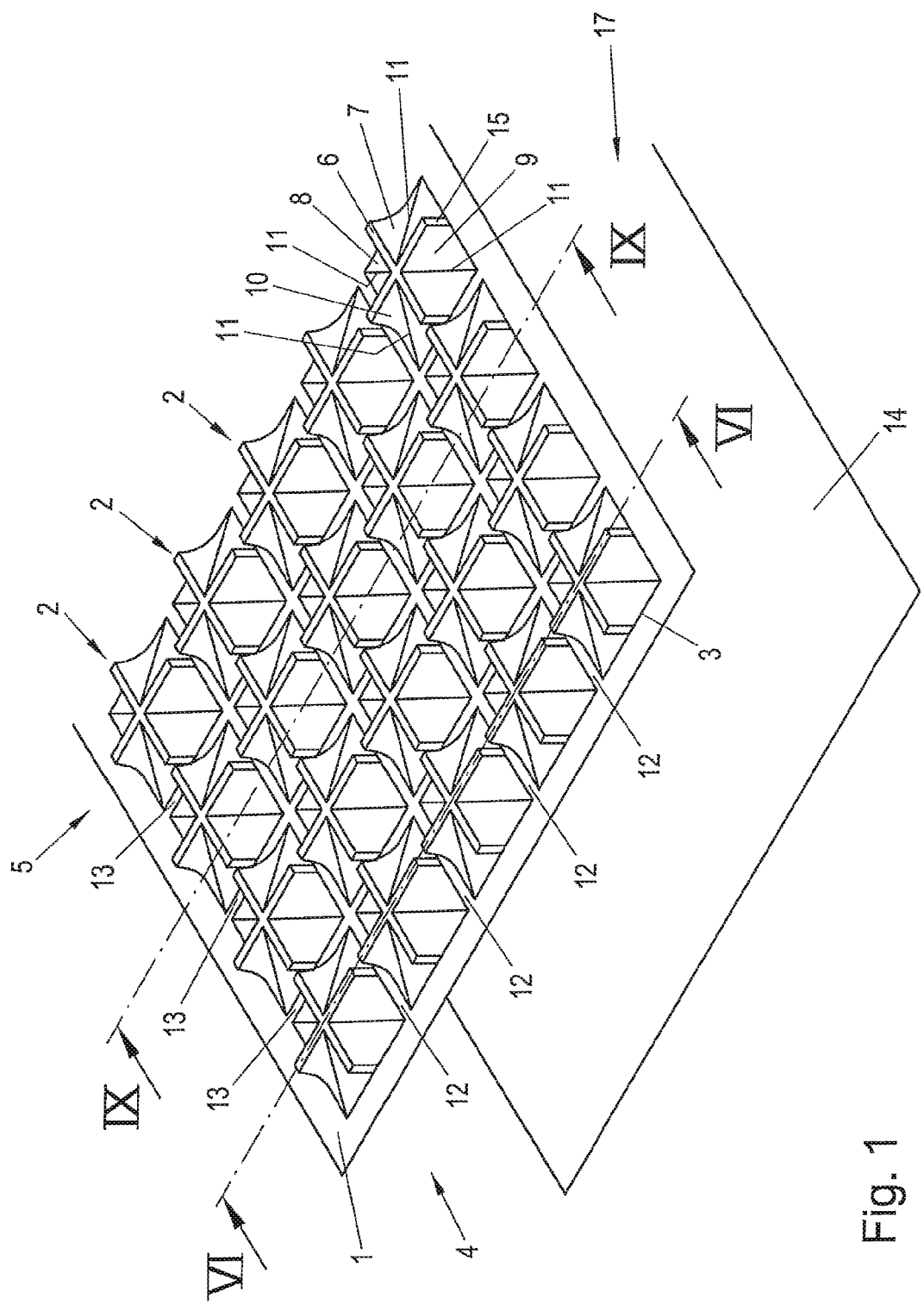
Figure 2:
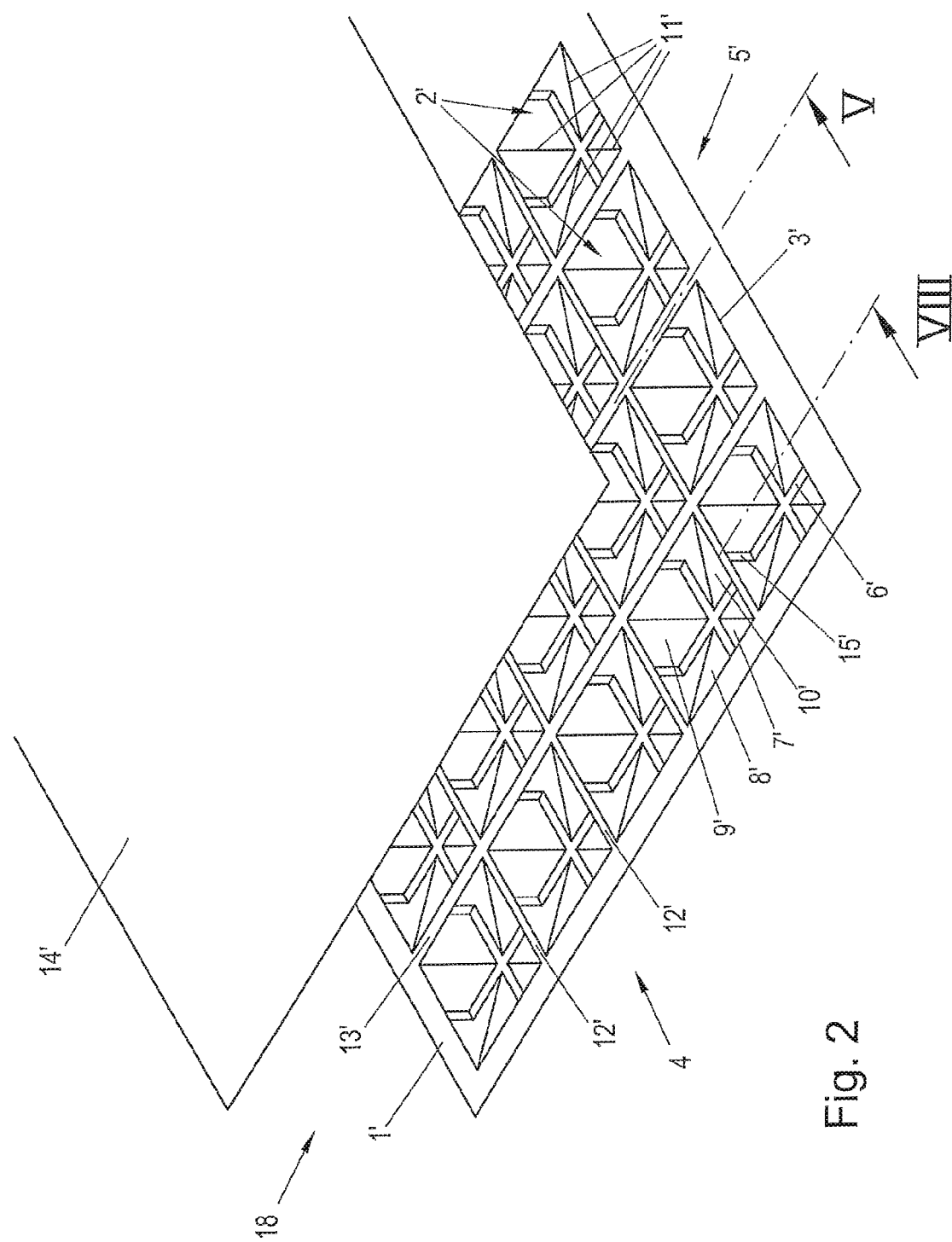
FIG. 2 shows a second flat element with recesses from the front side.
Figure 12:
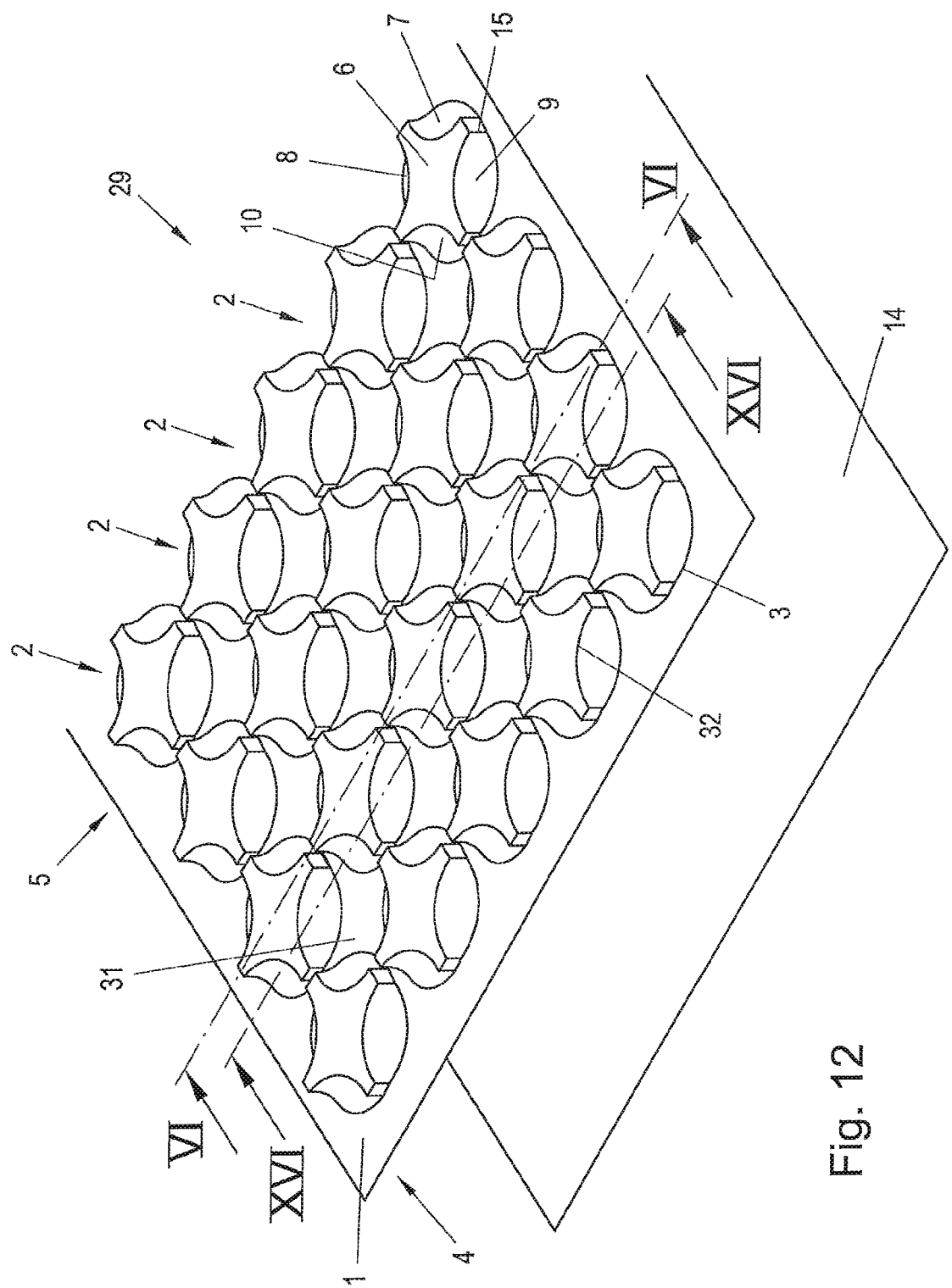
Figure 13:
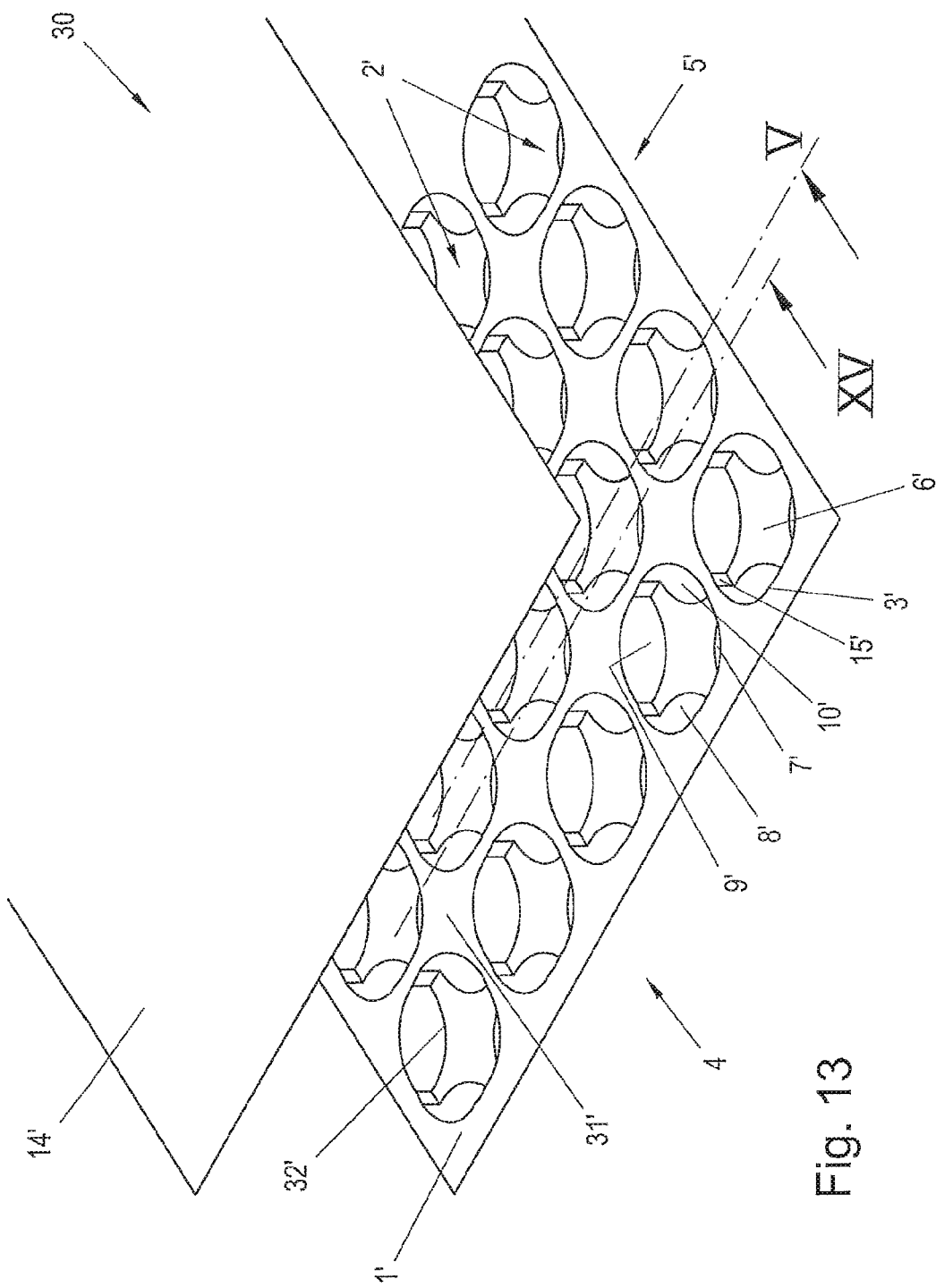
Figure 14:
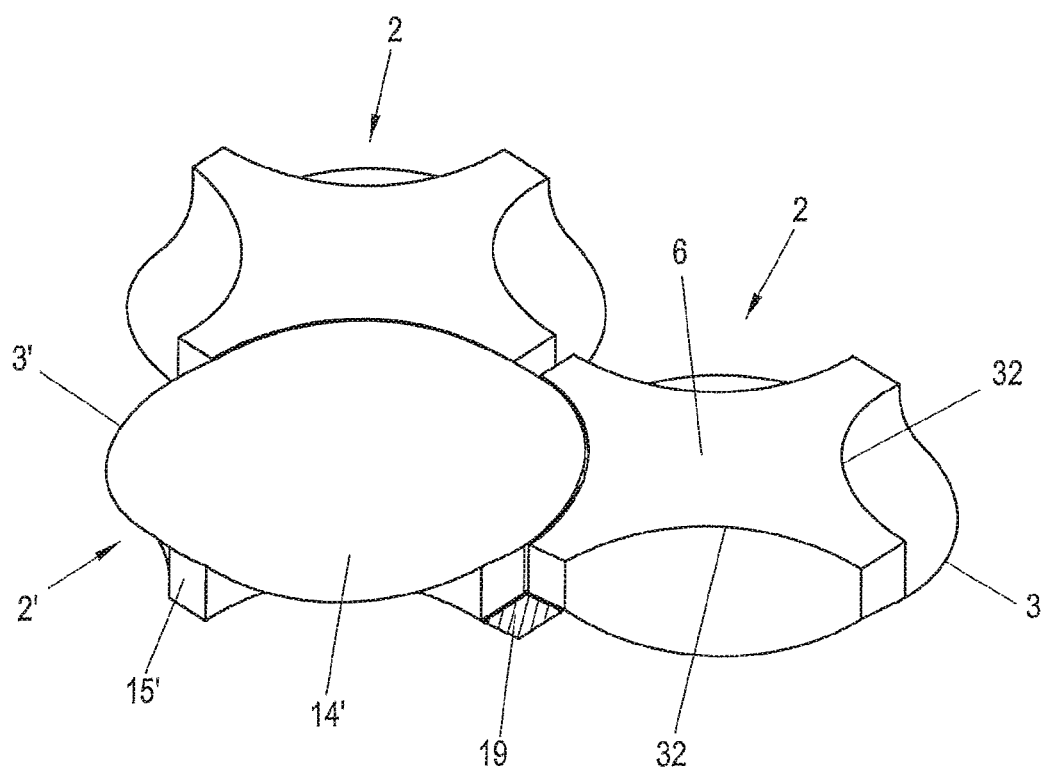
Figure 18:
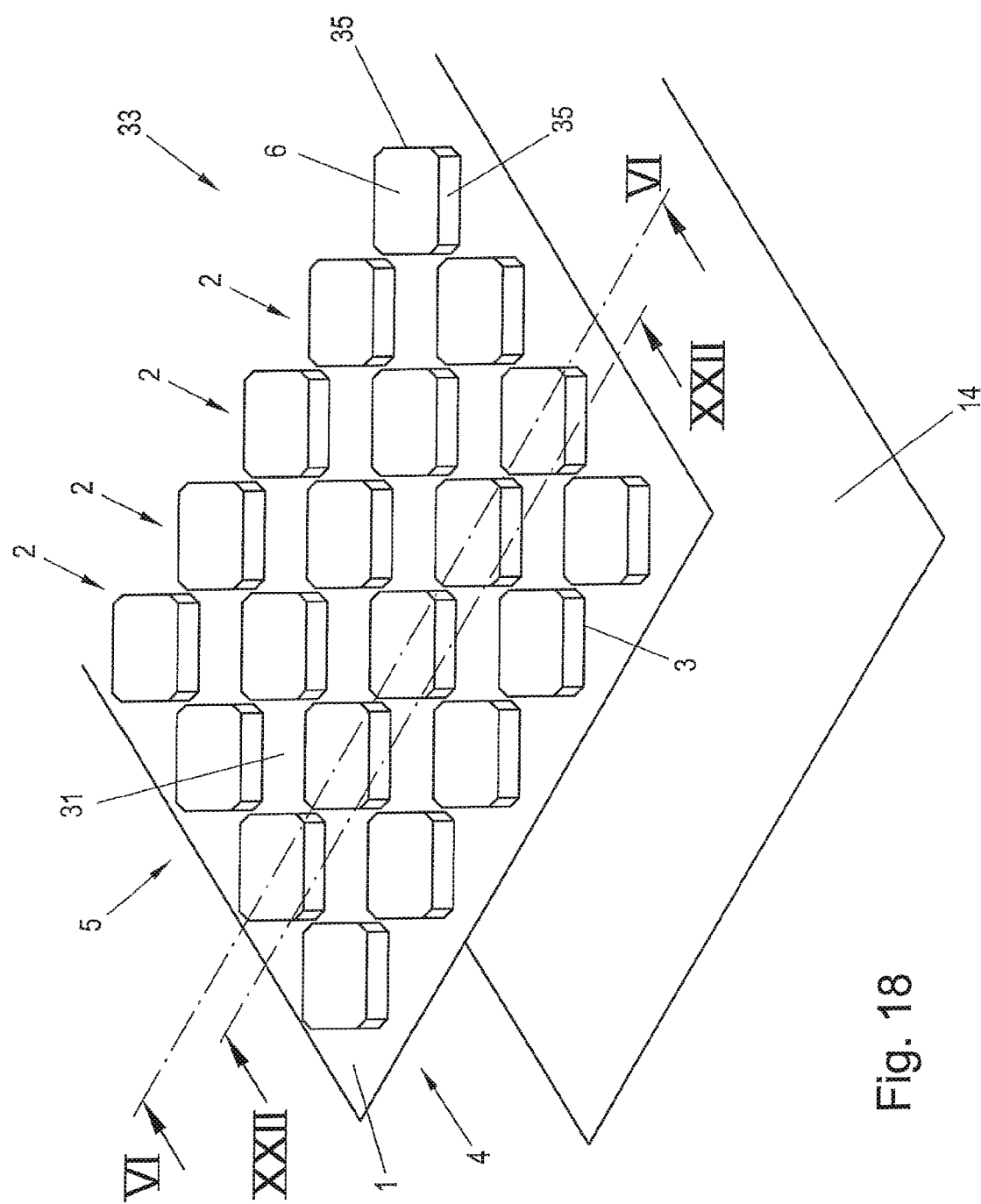
Figure 19:
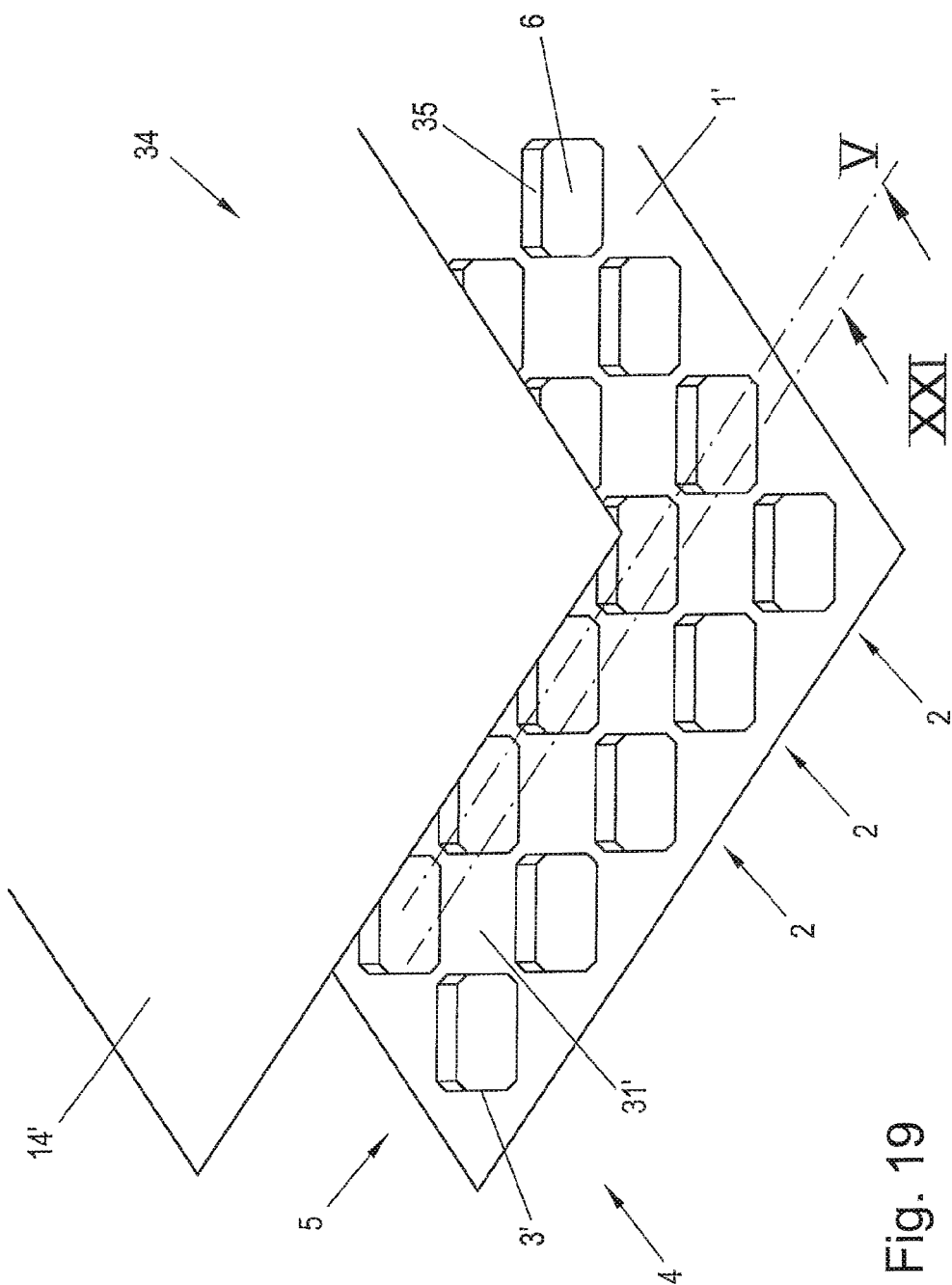
Figure 20:
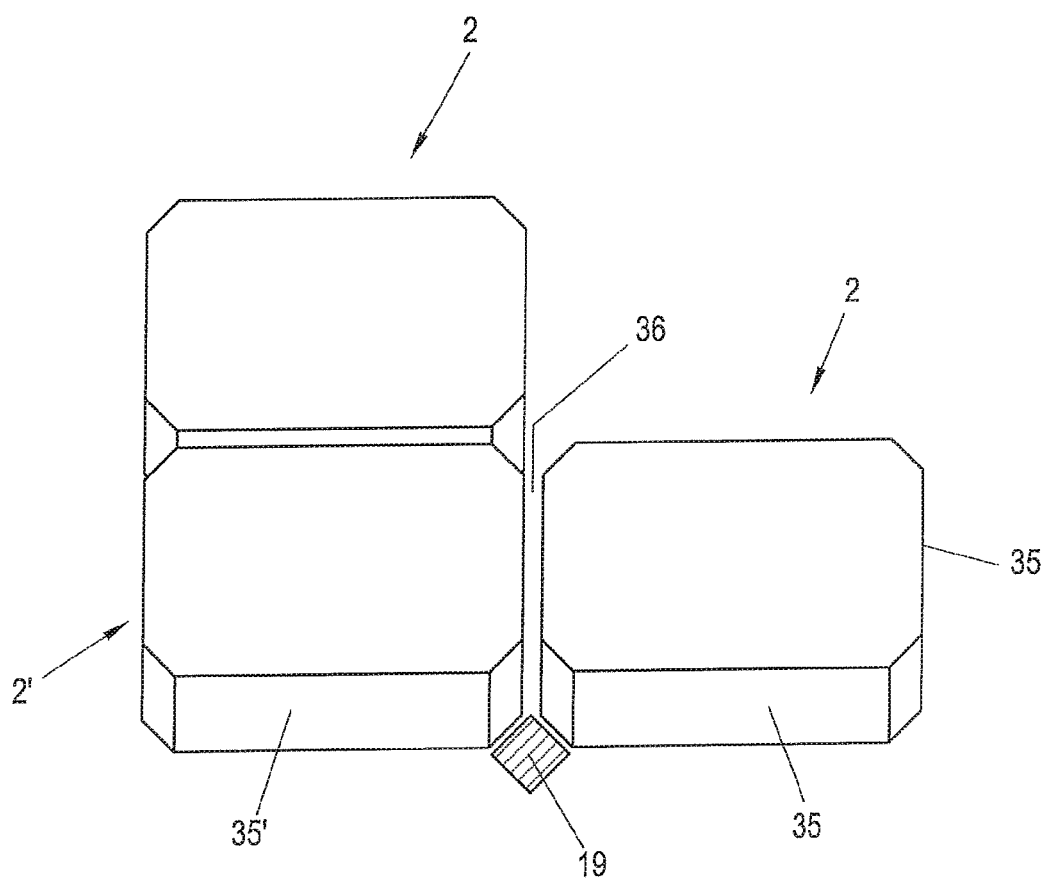
Figure 24:
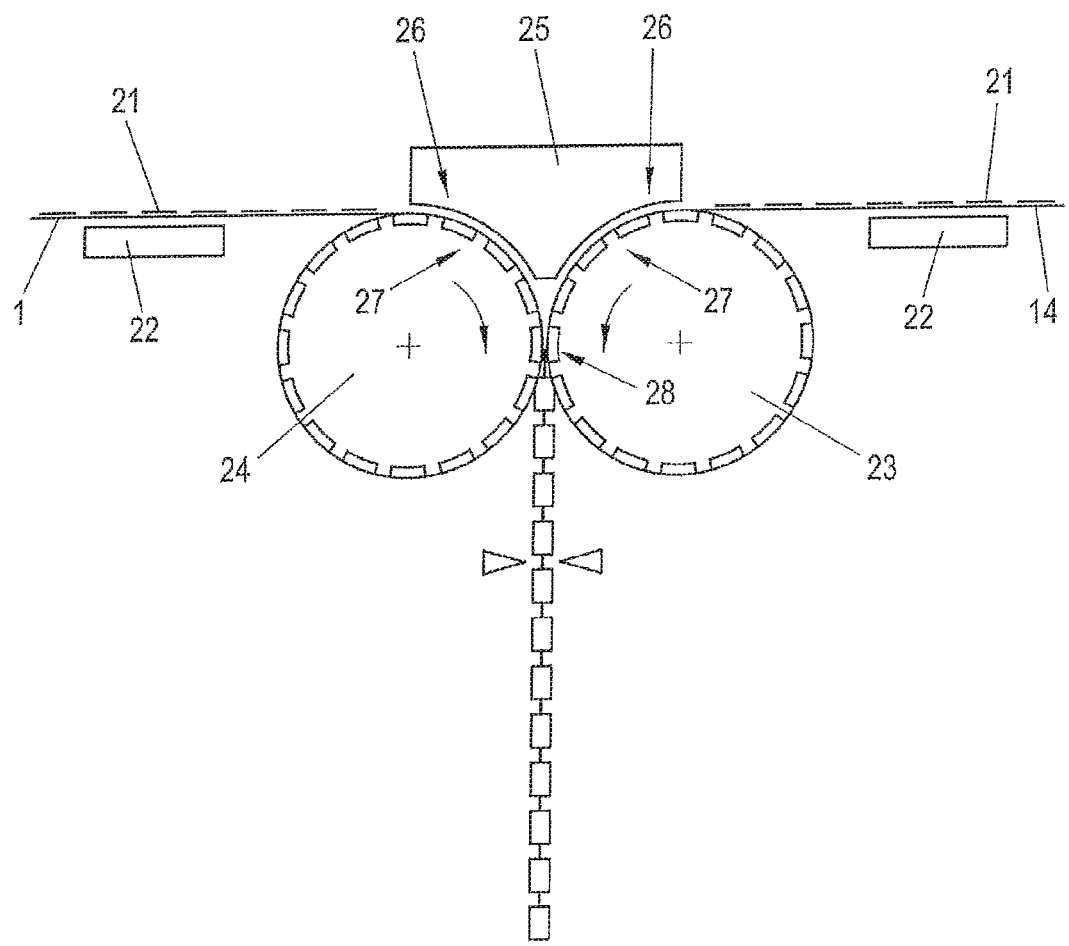
Figure 25:
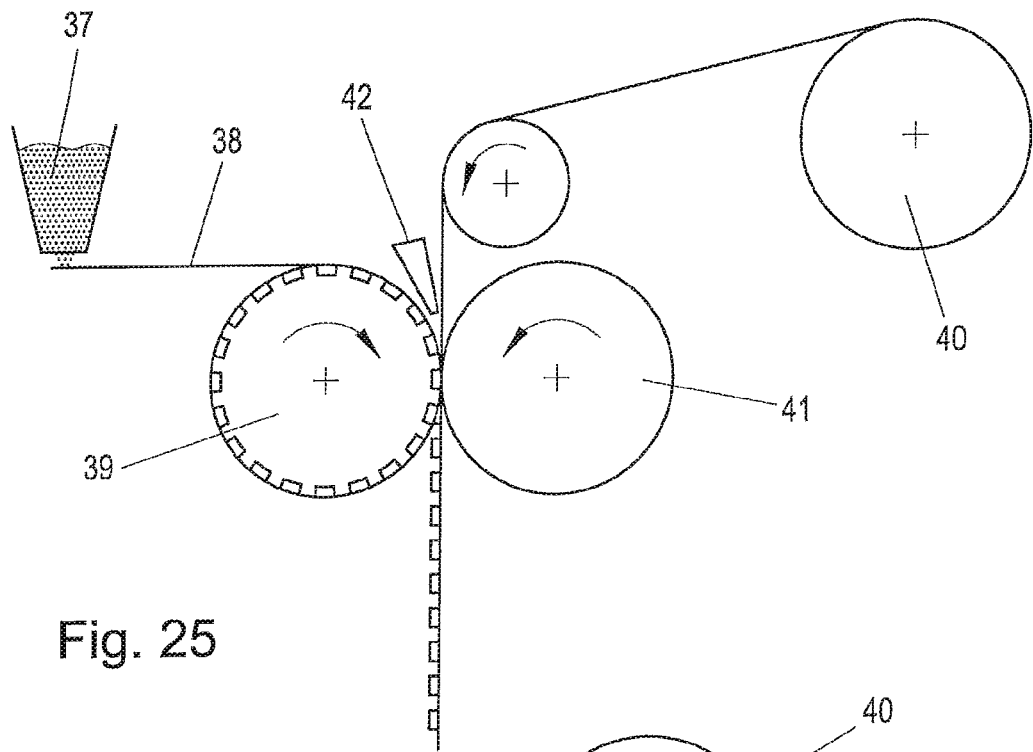
Figure 26:
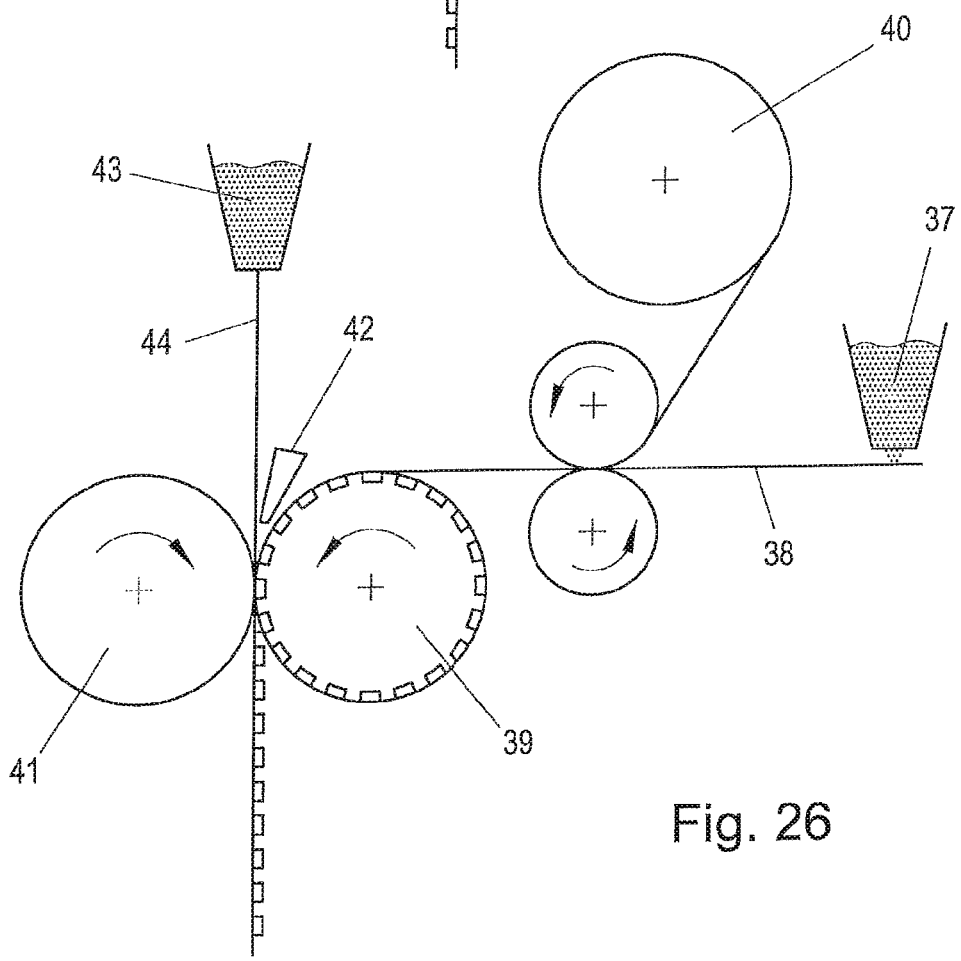
Figure 27:
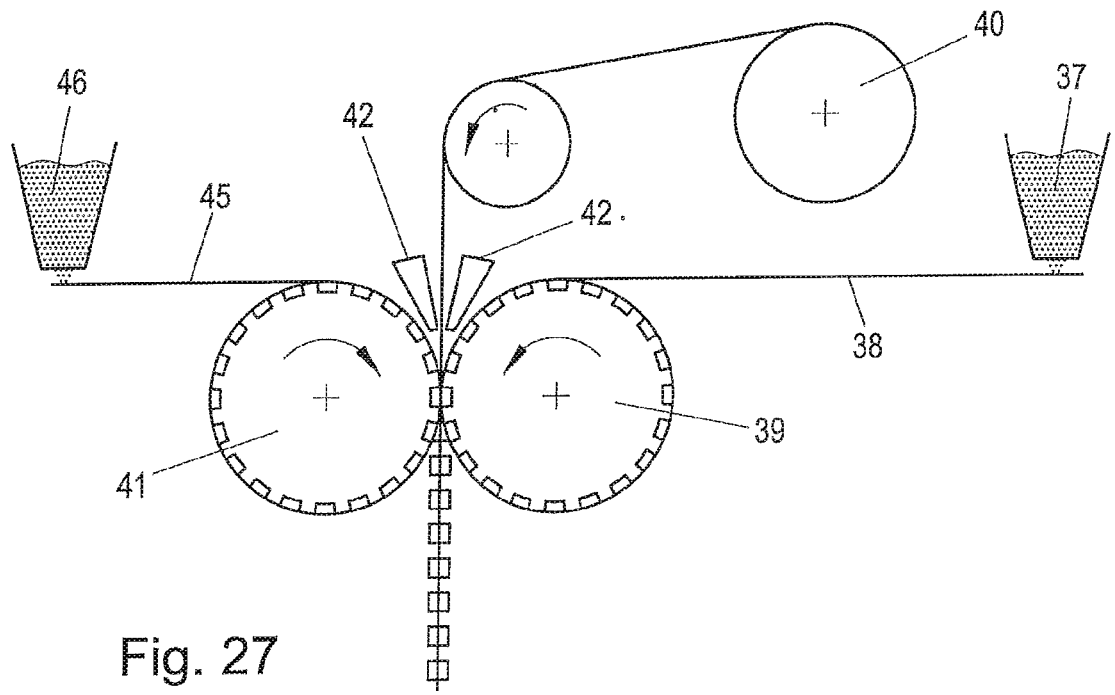
Figure 28:
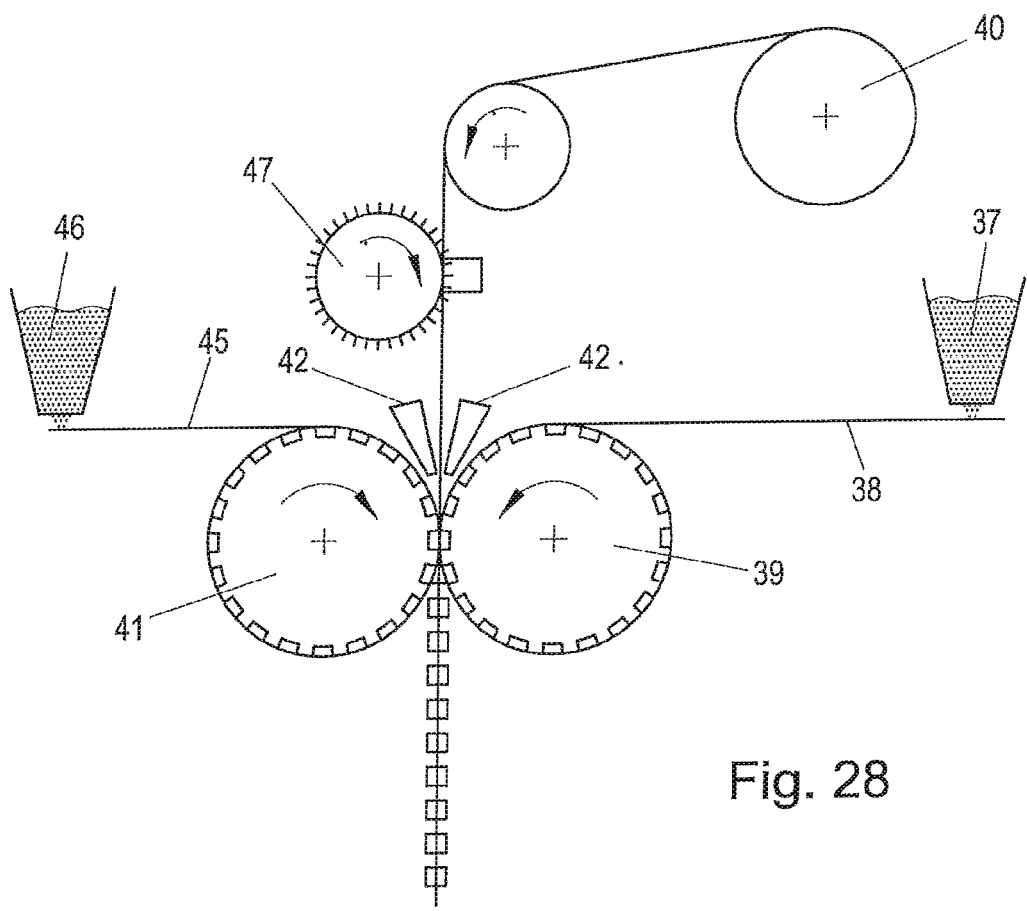

FIG. 7 is a sectional illustration corresponding to FIGS. 5 and 6, of the elements 17 and 18 fitted into each other;

FIG. 8 is a section through element 18 along line VIII-VIII of FIG. 2;

FIG. 9 is a section through the element 17 along line IX-IX of FIG. 1;

FIG. 10 is a sectional illustration corresponding to FIGS. 8 and 9, of the elements 17 and 18 fitted into each other;

FIG. 11 is a perspective sectional view of the insulating element;

FIG. 12 illustrates a modified first flat element with recesses from the rear side;

FIG. 13 illustrates a modified second flat element with recesses from the front side;

FIG. 14 is a detailed view of the arrangement of a first recess according to FIG. 13 between two second recesses according to FIG. 12;

FIG. 15 depicts a section through element 30 along line XV-XV of FIG. 13;

FIG. 16 depicts a section through element 29 along line XVI-XVI of FIG. 12;

FIG. 17 is a sectional illustration corresponding to FIGS. 15 and 16, of the elements 29 and 30 fitted into each other;

FIG. 18 illustrates a modified first flat element with recesses from the rear side;

FIG. 19 illustrates a modified second flat element with recesses from the front side;

FIG. 20 is a detailed view of the arrangement of a first recess according to FIG. 19 between two second recesses according to FIG. 18;

FIG. 21 depicts a section through element 34 along line XXI-XXI of FIG. 19;

FIG. 22 depicts a section through element 33 along line XXII-XXII of FIG. 18;

FIG. 23 is a sectional illustration corresponding to FIGS. 21 and 22, of the elements 33 and 34 fitted into each other;

FIG. 24 is a schematic illustration of a first variant of a production method;

FIG. 25 is a schematic illustration of a second variant of a production method;

FIG. 26 is a schematic illustration of a third variant of a production method;

FIG. 27 is a schematic illustration of a fourth variant of a production method; and FIG. 28 is a schematic illustration of a fifth variant of a production method.

FIGS. 1 to 10 illustrate a first configuration of an insulating element according to the invention. In FIG. 1, a first flat element, which is, for instance, comprised of a polymer film, is denoted by 1. The first flat element 1 comprises a plurality of first recesses 2 protruding from the first flat element 1 on the rear side thereof as illustrated in FIG. 1. The first recesses 2 each form a square opening 3, as can be particularly taken from the illustration of the front side of the identically structured element 1' according to FIG. 2. The first recesses 2 are arranged in a raster, the raster comprising lines extending in the sense of arrow 4 and columns extending in the sense of arrow 5, which extend at right angles relative to one another.

The first recesses 2 each have a bottom surface 6 in the form of a cross whose bars, in the normal projection on the first flat element 1, each connect the centers of opposite sides of the edge of an opening 3 and enclose a right angle with each other. The bottom surface 6 extends in parallel with the surface of the first flat element 1. The cross-shaped bottom surface 6 is connected to the edge of the opening 3 on each of the four sides of the recess 2 via a web portion 15 extending perpendicularly to the surface of the first flat element 1. The bars of the bottom surface 6 and the web portions 15 divide the recess 2 into four fourths, each having a substantially square ground plan. In each fourth, a wall portion 7, 8, 9 and 10 are respectively provided to connect the bottom surface 6 to the edge of the opening 3, thus being correspondingly obliquely or curvedly designed. The wall portions 7, 8, 9 and 10 each comprise a straight line 11 connecting the point of intersection of the cross-shaped bottom surface 6 with the nearest corner point of the square opening 3.

The first recesses 2 can be produced from the first flat element 1 in a simple manner by deep-drawing.

Between the first recesses 2, the first flat element 1 comprises first strip-shaped connecting regions 12 and 13, a plurality of first strip-shaped connect connecting regions 12 and a plurality of first strip-shaped connecting regions 13 forming a grid. In the first connecting regions 12 and 13, a first flat cover element 14, which is unstructured, i.e. planar, in the present exemplary embodiment, is materially connected to the first flat element 1 so as to close the openings of the first recesses 1 and obtain a first group of closed cells. In the illustration according to FIG. 1, the first flat cover element 14 is, however, shown in the unconnected state. Prior to closing, the recesses 2 can be filled with a gas having a thermal conductivity coefficient of <0.026 W/mK so as to obtain closed gas-filled cells.

FIG. 2 illustrates a second flat element 1', which is provided with a plurality of second recesses 2', wherein the structure is identical to that of the first flat element, reference thus being made to the above description while using the same reference numerals (supplemented by "'"). The second flat element 1' comprises second strip-shaped connecting regions 12' and 13'.

Figure 3:
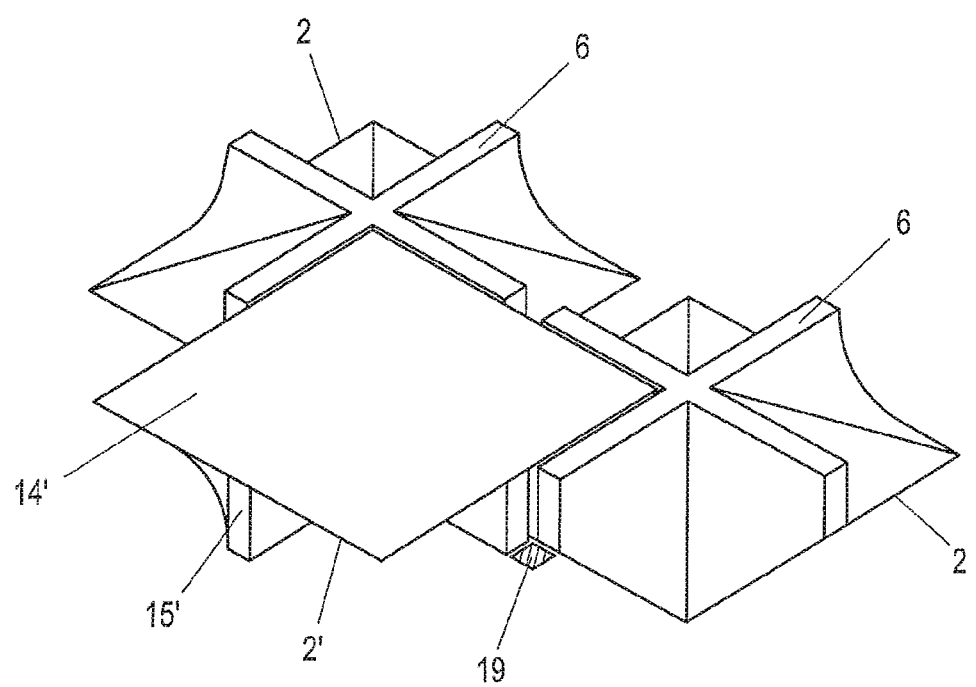
FIG. 3 is a detailed view of the arrangement of a first recess between two second recesses.

The shaping of the recesses 2, 2' is provided in such a manner that the element 17 shown in FIG. 1 (and comprised of the first flat element 1 to which the first flat cover element 14 is connected) and the element 18 shown in FIG. 2 (and comprised of the second flat element 1' to which the second flat cover element 14' is connected) fit into each other when assembled with their rear sides facing each other. In doing so, one of the second recesses 2' each comes to lie between a plurality of first recesses 2, and at the same time one of the first recesses 2 each comes to lie between a plurality of second recesses 2'. This is schematically illustrated in FIG. 3. It is apparent that a second recess 2' completely occupies the space between four first recesses 2 (of which only two are shown in FIG. 3 for the sake of clarity). To make this possible, it is contemplated that the width of the bars of the cross-shaped bottom surface 6 and the width of the connecting regions 12' and 13' are chosen to be identical. Said width is preferably between 3 and 5 mm. As illustrated in FIG. 3, such shaping ensures that a maximum volume between the parallel hounding planes of the insulating element comprised of elements 17 and 18 is occupied by closed cells that may be filled with a gas. In the present exemplary embodiment, only relatively small volumes remain free, i.e. the respective volume of a parallelepiped with the square base denoted by 19.

Figure 4:
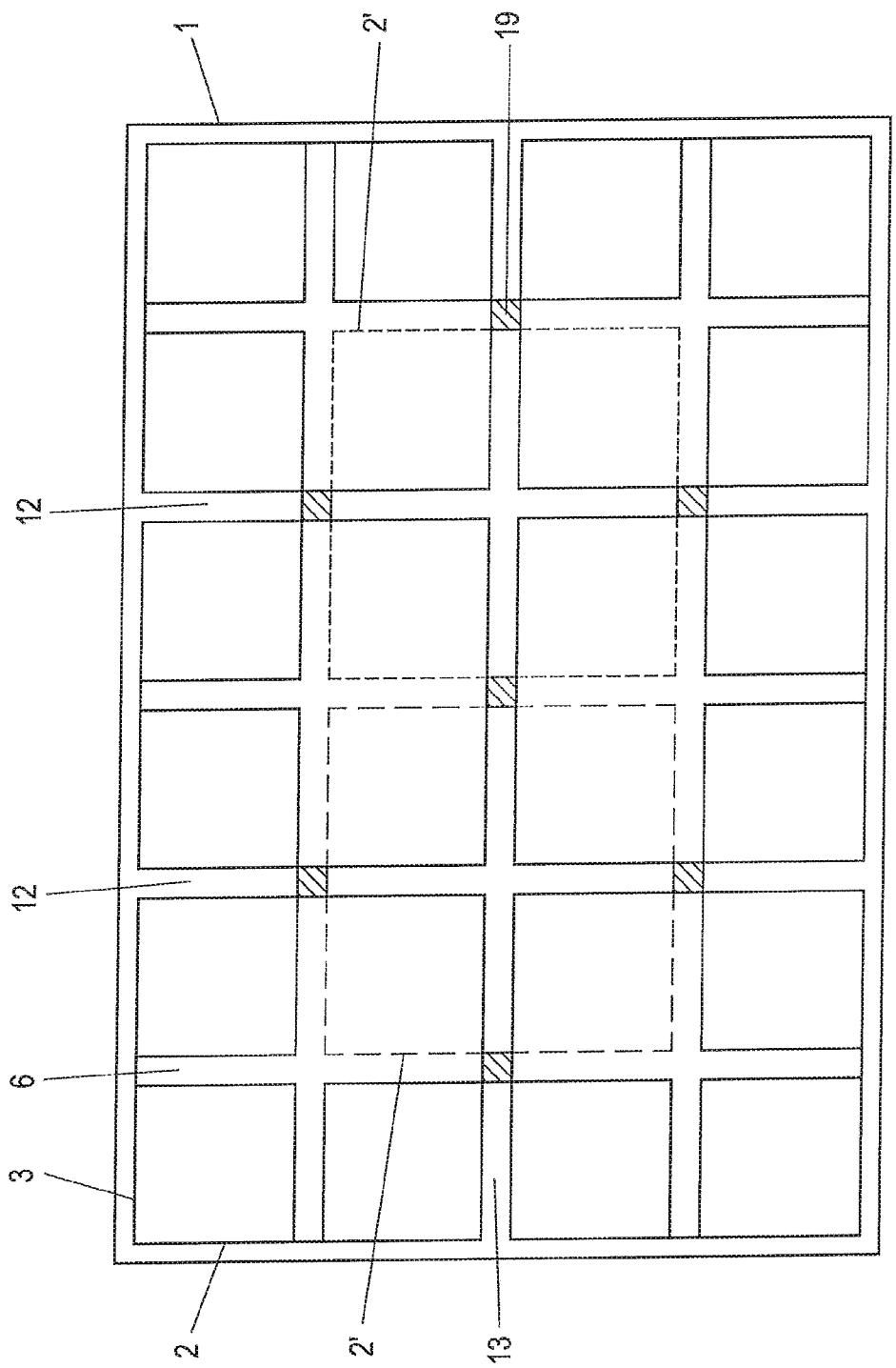
FIG. 4 is a schematic top view of a flat element.

FIG. 4 depicts a cutout of the insulating element composed of elements 17 and 18 in plan view, the contour of the first recesses 2 being illustrated by full lines and the contour of the second recesses 2' being shown by broken lines.

In the sectional view according to FIG. 5, the element 18 is shown in a section along line V-V of FIG. 2. This sectional view only shows the line of section proper, yet not the edges and the like lying behind the plane of section. The same applies to the sectional view according to FIG. 6, which shows the element 17 in a section along VI-VI of FIG. 1. In FIG. 7, the two sectional views according to FIGS. 5 and 6 are combined such that extracts of the elements 17 and 18 are depicted in the assembled state, in which the recesses 2 and 2' are located between each other as shown in FIG. 3.

The sectional views according to FIGS. 8, 9 and 10 correspond to the sectional views according to FIGS. 5, 6 and 7, respectively, yet the sections are offset, i.e. along line VIII-VIII of FIG. 2 for element 18 and along line IX-IX of FIG. 1 for element 17. In FIGS. 8 and 9, the elements 17 and 18 are shown separately, in FIG. 10 extracts of the elements 17 and 18 are shown in the assembled state, in which the recesses 2 and 2' are located between each other as shown in FIG. 3. It is apparent that the walls 9 and 9' as well as 10 and 10' of the recesses 2 and 2' lie closely adjacent each other, in particular lie flush against each other, and the bottom 6 of the first recess 2 each rests on the second connecting region 12' of the element 18 and, vice versa, the bottom 6' of the second recess 2' each rests on the first connecting region 12 of the element 17. In the rest-on region, the connection can be implemented via a material connection, e.g. by means of an adhesive or by welding.

FIG. 11 depicts a modified configuration of an insulating element in which both the element 17 and the element 18 are each comprised of a flat element 1 and 1', respectively, which is connected to a flat cover element 14 and 14', respectively, which, as in contrast to the configurations according to FIGS. 1 to 10, is not planar but comprises mirror-inverted recesses 20 and 20', respectively.

In a further variant (not illustrated), a (single) additional planar element may be disposed between the flat element 1 and the flat cover element 14 of FIG. 11, which additional planar element again divides into two parts the hollow space formed the mirror-inverted recesses 2 and 20. This additional planar element may advantageously be provided with a metal coating on one or two sides. Similarly, a (single) additional planar element may be disposed between the flat element 1' and the flat cover element 14' of FIG. 11, which additional planar element again divides into two parts the hollow space formed by the mirror-inverted recesses 2' and 20'.

In FIGS. 12 to 17, a second configuration of an insulating element according to the invention is illustrated. As opposed to the first configuration, the shape of the recesses 2 and 2' is different. Yet, the reference numerals used in FIGS. 1 to 10 have been retained for identical parts.

From FIGS. 12 and 13, it is apparent that the recesses 2 and 2' each form a circular opening 3 and 3', respectively, the flat elements 1 and 1' being again identically structured. The first recesses 2 each comprise a bottom surface 6 in the form of a cross with rounded or approximately quarter-circle-shaped connections or edges 32 between the bars of the cross. The surface area free of first recesses 2 between the first recesses 2 of the first flat element 1 forms a connecting region 31 in which the first flat cover element 14, which in the present exemplary embodiment is unstructured, i.e. planar, is materially connected to the first flat element 1 so as to close the openings 3 of the first recesses 1 and obtain a first group of closed cells. In the illustration according to FIG. 12, the first flat cover element 14 is, however, shown in the unconnected state. Prior to closing, the first recesses 2 can be filled with a gas having a thermal conductivity coefficient of <0.026 W/mK so as to obtain closed gas-filled cells.

The shaping of the recesses 2, 2' is provided in such a manner that the element 29 shown in FIG. 12 (and comprised of the first flat element 1 to which the first flat cover element 14 is connected) and the element 30 shown in FIG. 13 (and comprised of the second flat element 1' to which the second flat cover element 14' is connected) fit into each other when assembled with their rear sides facing each other. In doing so, one of the second recesses 2' each comes to lie between a plurality of first recesses 2, and at the same time one of the first recesses 2 each comes to lie between a plurality of second recesses 2'. This is schematically illustrated in FIG. 14. It is apparent that a second recess 2' completely occupies the space between four first recesses 2 (of which only two are shown in FIG. 14 for the sake of clarity). To make this possible, it is contemplated that the radius of the edges 32 is substantially identical with the radius of the circular opening 3', and the radius of the edges 32' is substantially identical with the radius of the circular opening 3. In this manner, the edges 32 of the bottom 6 of four recesses 2 together each enclose a circular region whose size corresponds to the opening 3' of a recess 2'. Between the peripherally adjoining edges 32, an interspace or intermediate region 19 is each provided, which is necessary to space apart neighboring recesses 2 and 2' and enable their closure while forming mutually separated cells with the aid of the flat cover element 14. Besides, approximately quarter-circular arcs of the edges of the openings 3 of four recesses 2 together each enclose a surface region whose size and shape corresponds to those of the bottom 6' of a recess 2'. Again, an interspace or intermediate region 19 is each provided between the mutually adjoining circular arcs of the edges 3.

As illustrated in FIG. 14, such shaping ensures that a maximum volume between the parallel bounding planes of the insulating element comprised of elements 29 and 30 is occupied by closed cells that may be filled with a gas. In the present exemplary embodiment, only relatively small volumes remain free, i.e. the respective volume of a parallelepiped with the square base denoted by 19.

Sectional views of elements 29 and 30 along lines V-V and VI-VI, respectively, are illustrated in FIGS. 5 and 6. Sections offset relative thereto are depicted FIGS. 15 and 16, the section in the case of element 30 extending along line XV-XV of FIG. 13 and in the case of element 29 extending along line XVI-XVI of FIG. 12. The sectional views again just show the lines of section proper, yet not the edges and the like lying behind the plane of section. In FIGS. 15 and 16, elements 29 and 30 are shown separately, in FIG. 17 extracts of the elements 29 and 30 are shown in the assembled state, in which the recesses 2 and 2' are located between each other as shown in FIG. 14. It is apparent that the walls 7' and 10 as well as 8' and 9 of the recesses 2 and 2' lie closely adjacent each other, in particular lie flush against each other, and the bottom 6 of the first recess 2 each rests on the second connecting region 31' of the element 30 and, vice versa, the bottom 6' of the second recess 2' each rests on the first connecting region 31 of the element 29. In the rest-on region, the connection can be implemented via a material connection, e.g. by means of an adhesive or by welding.

In FIGS. 18 to 23, a third configuration of an insulating element according to the invention is illustrated. As opposed to the first and second configurations, the shape of the recesses 2 and 2' is different. Yet, the reference numerals used in FIGS. 1 to 10 have been retained for identical parts.

From FIGS. 18 and 19, it is apparent that the recesses 2 and 2' each form a substantially rectangular or square opening 3 and 3', respectively, the flat elements 1 and 1' being again identically structured. The first recesses 2 each comprise a bottom surface 6 in the form of a rectangle or square with chamfered corners so as to form an octagon with alternately long and short sides. The bottom surface is connected to the opening 3 by preferably perpendicular side walls 35. The surface area free of first recesses 2 between the first recesses 2 of the first flat element 1 forms a connecting region 31 in which the first flat cover element 14, which in the present exemplary embodiment is unstructured, i.e. planar, is materially connected to the first flat element 1 so as to close the openings 3 of the first recesses 1 and obtain a first group of closed cells. In the illustration according to FIG. 18, the first flat cover element 14 is, however, shown in the unconnected state. Prior to closing, the first recesses 2 can be filled with a gas having a thermal conductivity coefficient of <0.026 W/mK so as to obtain closed gas-filled cells.

The shaping of the recesses 2, 2' is provided in such a manner that the element 33 shown in FIG. 18 (and comprised of the first flat element 1 to which the first flat cover element 14 is connected) and the element 34 shown in FIG. 19 (and comprised of the second flat element 1' to which the second flat cover element 14' is connected) fit into each other when assembled with their rear sides facing each other. In doing so, one of the second recesses 2' each comes to lie between a plurality of first recesses 2, and at the same time one of the first recesses 2 each comes to lie between a plurality of second recesses 2'. This is schematically illustrated in FIG. 20. It is apparent that a second recess 2' almost completely occupies the free space between four first recesses 2 (of which only two are shown in FIG. 20 for the sake of clarity). Such shaping ensures that a maximum volume between the parallel bounding planes of the insulating element comprised of elements 33 and 34 is occupied by closed cells that may be filled with a gas. In the present exemplary embodiment, only relatively small volumes remain free, i.e. the respective volume of a parallelepiped with the square base denoted by 19, and the volume of strip-shaped regions 36 between the lateral surfaces 35 and 35' of the recesses 2 and 2'.

Sectional views of elements 33 and 34 along lines V-V and VI-VI, respectively, are illustrated in FIGS. 5 and 6. Sections offset relative thereto are depicted in FIGS. 21 and 22, the section in the case of element 34 extending along line XXI-XXI of FIG. 19 and in the case of element 33 along line XXII-XXII of FIG. 18. The sectional views again just show the lines of section proper, yet not the edges and the like lying behind the plane of section. In FIGS. 21 and 22, elements 33 and 34 are shown separately, in FIG. 23 extracts of the elements 33 and 34 are shown in the assembled state, in which the recesses 2 and 2' are located between each other as shown in FIG. 20. It is apparent that the walls 35 and 35' of the recesses 2 and 2' are mutually spaced-apart by a gap 36, and the bottom 6 of the first recess 2 each rests on the second connecting region 31' of the element 34 and, vice versa, the bottom 6' of the second recess 2' each rests on the first connecting region 31 of the element 33. In the rest-on region, the connection can be implemented via a material connection, e.g. by means of an adhesive or by welding.

To sum up, it is a feature of the invention that as high a gas filling level as possible can be achieved at a simultaneously minimum thermal conduction and efficient and cost-effective production. In an exemplary embodiment, the cell structure is optimized such that the points below are met, wherein, in the following, reference is made to the first configuration according to FIGS. 1 to 10:

1) The individual elements 17,18 can be produced of two films 1,14 and 1',14', respectively, whose cells are filled with a gas.
2) Each individual cell is closed.
3) Empty interspaces (i.e. those not filled with gas) are minimized.
4) Thermal conduction through the cell structure is minimized at constant gas filling. This means that the inclination and shape of the walls of the recesses 2,2' are to be optimized.
5) The surface of the gas-filled cells is to be coated with a metal.
6) Further optimization (cf. FIG. 11) provides that two deep-drawn films 1,14 and 1',14', respectively, are connected to each other. This again allows for a decrease of costs (only half of the welding/gluing process) and an increase in performance, since heat radiation can be further minimized.

Due to points 2) and 3), a compromise must, however, be made. By closing the recesses 2, a web or connecting region 12, 13 must be provided, which, however, causes undesired intermediate spaces 19. The width of the connecting regions 12, 13 determines the size of the intermediate spaces 19 within an element 17, 18.

The shaping of the recesses allows for a reduction of the thermal conduction through the insulating element. To this end, the cells are constructed to maximize the path defined by the straight line 11 for the thermal conduction over the walls of the recesses. By the following exemplary calculation, it will be understood why this is important.

$$\text{Thermal conduction } \dot{Q} = \frac{\lambda}{d} * A * \Delta T$$

In general, thermal conduction is the product of the thermal conductivity coefficient, surface area and temperature difference, divided by the thickness of the insulation. In the event of a single cell, the surface area describes the cross section, and the thickness describes the path 11. The surface area remains the same in all cases. Yet, it is to be sought to maximize the path d. This is enabled in that the walls connect the quadrangular opening 3 to the cross-shaped bottom surface 6. It can be demonstrated that the cross structure minimizes the thermal conduction.

In order to achieve the optimum solution, efforts have been made to minimize each of the three thermal transfers. To this end, the following points have been pursued:

1) The Insulation is to be Gas-Filled

In order to minimize thermal conduction, the insulation is gas-filled. As already briefly described, the insulation is comprised of a cellular system of closed cells. The cellular system creates empty spaces. By filling the empty spaces with a gas, the thermal conductivity coefficient of <0.026 W/mK (air) in the empty spaces can be minimized by a multiple. In order to achieve a low insulating value, as much as possible of the insulation apparently has to be filled with a gas.

2) Gas Filling

As explained under point 1), the hollow spaces are filled with a gas to improve the insulating value. To achieve an improvement, a gas having a lower thermal conductivity coefficient than air (0.026 W/mK) is used. Thus, a gas having a thermal conductivity coefficient of <0.017 W/mK, better <0.009 W/mK, ideally <0.0055 W/mK is to be sought.

3) Film Coating

As described above, the insulation is advantageously comprised of a plastic film. The cells are produced by shaping the film. The surface of the film thus also constitutes the surface in the cell. In order to minimize heat radiation both outside and inside each cell, every layer can be coated with a material having a low emissivity. By the following equation, it can easily be calculated that a coating has a great influence:

$$\dot{Q}_{rad} = \frac{\sigma(T_1^4 - T_2^4)}{\frac{1-\varepsilon_1}{A_1\varepsilon_1} + \frac{1}{A_1 F_{1\to 2}} + \frac{1-\varepsilon_2}{A_2\varepsilon_2}}$$

Because of the coating, the emission values $\varepsilon_1$ and $\varepsilon_2$ are extremely reduced. Values lying below 0.5, better below 0.25, best below 0.04, are to be sought. The coating can be applied on one side or on both sides. Structural heat conduction is deteriorated by aluminum. Consequently, a layer thickness of <500 nm, better <200 nm, ideally 20-80 nm is to be sought.

4) Optimization of the Shape of the Individual Cells with a View to Achieving Minimum Structural Heat Conduction at Maximum Space Utilization.

In order to obtain an insulation filled with gas as much as possible, the shape of the cells was chosen such that several cells represent the negative of a cell. It is thus possible to stack the individual layers one into the other and optimally utilize the gas-filled space. The preferred cell shape will be described below. The opening of the recess constitutes a square. The base of the recess represents a cross. The connection of the two surfaces is implemented in every point via the shortest path.

5) Convection is Prevented

Another advantage of closed cells is that the circulation within a closed cell is reduced to a minimum.

The heat transfer coefficient $$\alpha = \frac{Nu * \lambda_F}{L}$$

describes the extent of the heat exchange from a gaseous to a solid medium. The Nusselt number Nu will only remain relatively small as long as a laminar flow prevails. This is guaranteed by closed cells.

The present invention offers several advantages over conventional insulations at a constant performance level.

Due to the closed cells, the insulation can be cut to any desired size and is thus very flexible in use.

Due to the layer system, any desired insulation thickness can be produced.

Waste material is used for the production of the insulation, costs can thus be kept extremely low.

Also the production process is very simple, thus further reducing costs.

The production of an element comprised of a flat element 1 and a flat cover element 14 can be implemented in the following manner, reference being made to FIG. 24. In the exemplary embodiment described, closed cells internally provided with a metallic coating are produced.

On the one hand, the flat element 1, in particular a polymer film, and, on the other hand, the flat cover element 14, in particular a polymer film, are supplied to a deep-drawing device comprising two counter-rotating rotary-deep-drawing rollers 23 and 24. The polymer films 1 and 14 carry metal coatings 21 on their upper sides. The coating 21 can be interrupted in the prospective connecting regions 12 and 13. The interruption can be provided by removing an all-over coating either by laser or mechanically, or the coating may not be applied all-over. The connection of the cover element 14 with the connecting regions 12 and 13 of the flat element 1 can be effected by welding, in particular ultrasonic welding. Alternatively, the coating 21 provided without interruptions, and an adhesive is applied in the prospective connecting regions 12 and 13.

The polymer films 1 and 14 are each heated by a radiant heater from their lower sides, where no metallic coating is provided, in order to bring the polymer film to the required temperature for the deep-drawing process (between 70 and 180° C. depending on the respective material).

In the region of the gap between the two rotary-deep-drawing rollers 23 and 24, a gas nozzle 25 is arranged, from which a gas with a low thermal conductivity is injected towards the gap (e.g. argon, $CO_2$, krypton or mixtures thereof) prior to closing the cells. In doing so, slightly more gas than would fit into the cells is preferably blown in so as to create a slight overpressure, on the one hand, and cause a slight backflow preventing the penetration of air, on the other hand. Alternatively, gas can also be injected at negative pressure, yet in that case a mechanical seal would have to be provided in the region 26.

The rotary-deep-drawing rollers 23 and 24 serve to draw the polymer films 1 and 14 into the desired shape by means of negative pressure, each in region 27. To this end, the rotary-deep-drawing rollers 23 and 24 comprise recesses corresponding to the recesses 2 and 20 to be realized. In the region 28, the two polymer films 1 and 14 are welded together in the connecting regions 12 and 13, which are formed without coating 21, or are glued together. Thus, closed gas-filled cells are formed with the coating 21 provided on the cell wall inner sides.

The semi-finished product comprised of the two polymer films 1 and 14 is cut to the desired panel size, in particular mechanically or by laser.

After this, the semi-finished products can be stacked and mutually glued or welded together to form an insulating element according to the invention.

FIGS. 25-28 depict alternative production methods in which the films 1 and 14 are produced by an extrusion process. As compared to deep-drawing, extrusion offers the advantage that a film is directly extruded from a granulate of PET, PE or PP or any other plastic material, which film is subsequently formed and, in the semi-solid state, would either be laminated with, or connected to, a thin coated film. This method requires less energy than deep-drawing, and the film-producing step can be directly integrated.

In the method according to FIG. 25, a plastic granulate 37 is heated by means of an extruder and extruded into a film 38. The not yet cooled film 38 is brought into cell form by a profiled roller 39. A flat, metallically coated film 40 is laminated onto the formed film 38 by pressing the film 40 against the profiled roller 39 by means of a counter-roller 41, thus closing the cells. Prior to laminating, the cells, between the formed film 38 and the flat, metallically coated film 40, are filled with gas fed through nozzle 42. In this variant, the flat side of the cell is metallically coated.

In the method according to FIG. 26, a plastic granulate 37 is heated by means of an extruder and extruded into a film 38. The not yet cooled film 38 is metallically laminated with a film 40. The not yet cooled, metallically laminated film 38 is brought into cell form by means of a profiled roller 39. A not yet cooled film 44 extruded from a plastic granulate 43 is laminated onto the formed film 38 by pressing the film 44 against the profiled roller 39 by means of a counter-roller 41, thus closing the cells. Prior to laminating, the cells, between the formed film 38 and the flat, metallically coated film 40, are filled with a gas fed through nozzle 42. In this variant, the formed side of the cell is metallically coated, thus achieving a slightly better thermal insulating value than with the configuration according to FIG. 25.

The method according to FIG. 27 substantially corresponds to the method according to FIG. 25 with the difference that, when assembling the film 38 and the metallically coated film 40, a further film 45 is additionally supplied via the counter-roller designed as a profiled roller 41, so as to produce in a single step mirror-inverted cells that are mutually separated by the metallically coated film 40. The further film 45 is extruded from a plastic granulate 46.

The method according to FIG. 28 constitutes a further development of the method according to FIG. 27, wherein the metallically coated film 40, prior to being supplied to rollers 39 and 41, is perforated by means of a perforating device 47 in order to improve the adherence between films 38 and 45.

The invention claimed is:

1. A panel-shaped insulating element for thermally insulating spaces, comprising a plurality of closed cells, wherein a first group of closed cells is formed by first recesses in a first flat element, and the first flat element between edges of openings of adjacent recesses forms first connection regions to which a first flat cover element closing the openings of the first recesses is materially bonded on a front side of the first flat element, characterized in that a second group of closed cells is provided, which is formed by second recesses in a second flat element, and the second flat element between edges of openings of adjacent recesses forms second connection regions to which a second flat cover element closing the openings of the second recesses is materially bonded on a front side of the second flat element, wherein the second recesses are provided on a rear side of the first flat element between the first recesses, and the first recesses are provided on a rear side of the second flat element between the second recesses, so that a volume remaining free of first and second recesses between the first and second flat elements is less than 50% of a volume enclosed by the first and second recesses together, wherein the first and second connecting regions are strip-shaped, forming a grid of strip-shaped connecting regions extending transversely at an angle of 90°, relative to one another, and bases of the first and second recesses are cross-shaped and the first recesses are arranged such that a cross-shaped base of the first recesses of the first flat element, over its entire length, rests on two intersecting strip-shaped connecting regions of the second flat element.

2. The panel-shaped insulating element according to claim 1, characterized in that the second recesses each comprise a base, an opening and walls connecting the base to the edge of the opening, wherein the second recesses are disposed on a rear side of the first flat element in such a manner that the bases of the second recesses in the first connecting regions contact the same.

3. The panel-shaped insulating element according to claim 2, characterized in that a sum of surface areas of the bases of the second recesses is equal to at least 70% of a sum of the surface areas of the first connecting regions.

4. The panel-shaped insulating element according to claim 1, characterized in that the first recesses each comprise a base, an opening and walls connecting the base to the edge of the opening, wherein the first recesses are disposed on a rear side of the second flat element in such a manner that the bases of the first recesses in the second connecting regions contact the same.

5. The panel-shaped insulating element according to claim 4, characterized in that a sum of surface areas of the bases of the first recesses is equal to at least 70% of a sum of the surface areas of the second connecting regions.

6. The panel-shaped insulating element according to claim 1, characterized in that the first connecting regions are formed by a total surface area free of first recesses, of the first flat element, and/or the second connecting regions are formed by a total surface area free of second recesses, of the second flat element.

7. The panel-shaped insulating element according to claim 4, characterized in that the walls of the first recesses and the walls of the second recesses are arranged in parallel or lie in planar abutment with each other.

8. The panel-shaped insulating element according to claim 1, characterized in that the first and second flat cover elements extend in parallel with each other and, in particular, are planarly designed.

9. The panel-shaped insulating element according to claim 1, characterized in that the first recesses and/or second recesses are arranged in a raster comprising a plurality of rows and columns of recesses, the rows and columns extending transversely to one another at an angle of 90°.

10. The panel-shaped insulating element according to claim 1, characterized in that the openings of the first recesses and/or second recesses are rectangular or square.

11. The panel-shaped insulating element according to claim 1, characterized in that the walls of the first recesses and/or second recesses each obliquely extend to the nearest edge, starting from the cross-shaped base.

12. The panel-shaped insulating element according to claim 1, characterized in that the first and the second recesses have the same three-dimensional shape.

13. The panel-shaped insulating element according to claim 1, characterized in that the rear side of the first recesses represents a negative form for at least a second recess.

14. The panel-shaped insulating element according to claim 1, characterized in that the cells are filled with a gas having a thermal conductivity coefficient of <0.026 W/mK.

15. The panel-shaped insulating element according to claim 1, characterized in that the first flat element and/or the second flat element, and the first flat cover element and/or the second flat cover element, are formed by a polymer film.

16. The panel-shaped insulating element according to claim 1, characterized in that the first flat element and/or the second flat element, and the first flat cover element and/or the second flat cover element, on at least one side comprises a coating with an emissivity of <0.5.

17. The panel-shaped insulating element according to claim 16, characterized in that the coating is applied on inner sides of the cells.

18. The panel-shaped insulating element according to claim 16, characterized in that the coating has a layer thickness of <80 nm.

19. The panel-shaped insulating element according to claim 1, characterized in that the first flat cover element and/or the second flat cover element comprises a plurality of third and fourth recesses, respectively, which are designed to be mirror-inverted relative to the first and second recesses, respectively, wherein the first flat cover element and/or second flat cover element between the edges of the openings of adjacent third and/or fourth recesses forms third and/or fourth connecting regions, the first and third, and the second and fourth, connecting regions being materially bonded to each other.

20. The panel-shaped insulating element according to claim 19, characterized in that the first recesses and/or second recesses, and the third recesses and/or fourth recesses, are obtained from the respective flat element and the respective flat cover element by deep-drawing.

21. The panel-shaped insulating element according to claim 15, wherein said polymer film has a thickness of 0.01 mm to 1 mm.

* * * * *